(12) United States Patent
Gholmieh et al.

(10) Patent No.: US 11,895,679 B2
(45) Date of Patent: Feb. 6, 2024

(54) COLLISION AVOIDANCE OF HALF-DUPLEX RESOURCE SELECTION

(71) Applicant: QUALCOMM Incorporated, San Diego, CA (US)

(72) Inventors: Ralph Akram Gholmieh, San Diego, CA (US); Cheol Hee Park, San Diego, CA (US); Arvind Vardarajan Santhanam, San Diego, CA (US); Shailesh Patil, San Diego, CA (US); Ashish Shankar Iyer, San Diego, CA (US); Praveen Kumar Appani, San Diego, CA (US); Feng Lu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 16/680,252

(22) Filed: Nov. 11, 2019

(65) Prior Publication Data
US 2020/0154440 A1 May 14, 2020

Related U.S. Application Data

(60) Provisional application No. 62/760,737, filed on Nov. 13, 2018.

(51) Int. Cl.
*H04W 72/53* (2023.01)
*H04L 5/16* (2006.01)
(Continued)

(52) U.S. Cl.
CPC .......... *H04W 72/53* (2023.01); *H04B 17/318* (2015.01); *H04B 17/336* (2015.01);
(Continued)

(58) Field of Classification Search
CPC ............. H04W 72/0493; H04W 24/08; H04W 28/0284; H04W 4/40; H04W 28/0268;
(Continued)

(56) References Cited

U.S. PATENT DOCUMENTS

| 10,200,185 B2 | 2/2019 | You et al. |
| 2012/0257519 A1* | 10/2012 | Frank ................... H04W 72/02 370/252 |

(Continued)

FOREIGN PATENT DOCUMENTS

| WO | WO2017135998 A1 | 8/2017 |
| WO | WO-2017169111 A1 | 10/2017 |

(Continued)

OTHER PUBLICATIONS

Jeon et al., "Reducing Message Collisions in Sensing-Based Semi-Persistent Scheduling (SPS) by Using Reselection Lookaheads in Cellular V2X", Department of Computer Science and Engineering, Korea University, Sensors 2018 (Year: 2018).*

(Continued)

*Primary Examiner* — Justin T Van Roie
(74) *Attorney, Agent, or Firm* — Holland & Hart LLP

(57) ABSTRACT

Methods, systems, and devices for wireless communications are described. A user equipment (UE) and another device (e.g., another UE) may transmit messages on a shared channel accessed in a half-duplex manner (e.g., within a vehicle-to-everything (V2X) network). The UE and the other device may transmit messages on semi-persistently scheduled (SPS) resources. A message of the UE and a transmission of the other device may collide (e.g., be transmitted in the same subframe). The UE may employ muting and measuring, in which the UE may refrain from transmitting on a SPS resource and may detect the transmission of the other device. Upon detection of other transmissions, the (Continued)

UE may perform resource reselection. During resource selection or resource reselection, the UE may exclude an entire subframe of candidate resources if one of the candidate resources of the subframe is mapped to a resource associated with a transmission from another device.

54 Claims, 19 Drawing Sheets

(51) Int. Cl.
| | |
|---|---|
| *H04W 24/08* | (2009.01) |
| *H04W 28/02* | (2009.01) |
| *H04W 4/40* | (2018.01) |
| *H04L 1/1812* | (2023.01) |
| *H04B 17/318* | (2015.01) |
| *H04B 17/336* | (2015.01) |

(52) U.S. Cl.
CPC ............. *H04L 1/1816* (2013.01); *H04L 5/16* (2013.01); *H04W 4/40* (2018.02); *H04W 24/08* (2013.01); *H04W 28/0268* (2013.01); *H04W 28/0284* (2013.01)

(58) Field of Classification Search
CPC ....... H04L 5/16; H04L 1/1816; H04B 17/318; H04B 17/336
See application file for complete search history.

(56) References Cited

U.S. PATENT DOCUMENTS

| | | | |
|---|---|---|---|
| 2017/0188391 A1 | 6/2017 | Rajagopal et al. | |
| 2018/0054833 A1 | 2/2018 | Ji et al. | |
| 2018/0352582 A1 | 12/2018 | Yi et al. | |
| 2019/0059115 A1* | 2/2019 | Uchiyama | H04W 92/18 |
| 2019/0191461 A1* | 6/2019 | Lee | H04W 76/27 |
| 2019/0207662 A1* | 7/2019 | Zhou | H04L 5/0048 |
| 2020/0280961 A1* | 9/2020 | Lee | H04W 72/04 |
| 2020/0288432 A1* | 9/2020 | Min | H04W 74/0808 |
| 2021/0314796 A1* | 10/2021 | Hoang | H04W 52/36 |

FOREIGN PATENT DOCUMENTS

| | | | | |
|---|---|---|---|---|
| WO | WO-2018031086 A1 * | 2/2018 | ............. | H04W 4/40 |
| WO | WO2018171233 A1 | 9/2018 | | |
| WO | WO-2018174661 A1 | 9/2018 | | |
| WO | WO-2018175822 A1 | 9/2018 | | |

OTHER PUBLICATIONS

Sadek A.K., et al., "Listen-Before-Talk Versus Treating Interference as Noise for Spectrum Sharing," IEEE Symposium on New Frontiers in Dynamic Spectrum Access Networks, 2008, 6 pages.

Intel Corporation: "On Sensing Design Details for Sidelink V2V Communication", 3GPP TSG RAN WG1 Meeting #86bis, 3GPP Draft; R1-162363 Intel—V2V Sensing, 3rd Generation Partnership Project (3GPP), Mobile Competence Centre, 650, Route Des Lucioles ; F-06921 Sophia-Antipolis Cedex, France, vol. RAN WG1, No. Busan, Korea; Apr. 11, 2016-Apr. 15, 2016, Apr. 2, 2016 (Apr. 2, 2016), pp. 1-10, XP051080142, Retrieved from the Internet : URL: http://www.3gpp.org/ftp/tsg_ran/WG1_RL1/TSGR1_84b/Docs/ [retrieved on Apr. 2, 2016].

International Search Report and Written Opinion—PCT/US2019/060893—ISA/EPO—dated Feb. 18, 2020.

Nabil A., et al., "Performance Analysis of Sensing-Based Semi-Persistent Scheduling in C-V2X Networks", 2018 IEEE 88th Vehicular Technology Conference (VTC-FALL), IEEE, Aug. 27, 2018 (Aug. 27, 2018), pp. 1-5, XP033535221, DOI: 10.1109/VTCFALL.2018.8690600 [retrieved on Apr. 12, 2019].

Taiwan Search Report—TW108140960—TIPO—dated Feb. 6, 2023.

* cited by examiner

COLLISION AVOIDANCE OF HALF-DUPLEX RESOURCE SELECTION

CROSS REFERENCE

The present Application for Patent claims the benefit of U.S. Provisional Patent Application No. 62/760,737 by GHOLMIEH et al., entitled "COLLISION AVOIDANCE OF HALF-DUPLEX RESOURCE SELECTION," filed Nov. 13, 2018, assigned to the assignee hereof, and expressly incorporated herein.

BACKGROUND

The following relates generally to wireless communications, and more specifically to collision avoidance of half-duplex resource selection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may transmit messages within a shared channel in a half-duplex manner. In such cases, a UE may either transmit or receive, but may not do both, at a given instance of time. In some cases, transmissions from other devices that are sent while the UE is transmitting may collide with the UE's transmission. Since the UE is transmitting, the UE may not receive or detect the transmissions from the other devices. Thus, the UE may not be aware a collision has occurred. Collisions may negatively affect wireless communications by generating interference.

SUMMARY

The described techniques relate to improved methods, systems, devices, and apparatuses that support collision avoidance of half-duplex resource selection. Generally, the described techniques provide for enabling a user equipment (UE) to avoid collisions in a shared channel when operating in a half-duplex manner (e.g., a vehicle-to-everything (V2X) network). In some examples, the UE may identify that it is configured to transmit over a set of periodic semi-persistently scheduled (SPS) resources in the shared channel. The UE may mute a transmission of a message during one of those periodic SPS resources and may monitor for transmissions from another device during that SPS resource, upon which the UE may detect a transmission from the other device during the SPS resource. The UE may then adjust transmission of the message to a different resource (e.g., a non-SPS resource within the same SPS period) and may, additionally or alternatively, acquire a new set of periodic SPS resources (e.g., for subsequent or future SPS periods).

In some examples, the UE may identify that it is configured for SPS transmissions via a configuration of periodic SPS resources and may, additionally, identify that it is to participate in an SPS reselection process, which may update the configuration of periodic SPS resources. To aid in the SPS reselection process, the UE may measure signals and identify potential interference on a portion of frequency resources in a subframe of one or more subframes (e.g., via a high received signal strength indicator (RSSI) value on the subframe). Based on the indication of potential interference, the UE may exclude an entirety of the subframe from the SPS resource reselection process.

A method of wireless communication at a UE is described. The method may include identifying that the UE is configured to transmit via a set of periodic SPS resources on a shared channel accessed in a half-duplex manner, muting transmission of a message during at least one of the SPS resources in order to monitor for transmissions from another device during the at least one SPS resource, detecting a transmission from the other device on the shared channel during the at least one SPS resource, and adjusting, based on detection of the transmission from the other device during the at least one SPS resource, transmission of the message to a different resource in order to avoid overlapping transmissions from the other device.

An apparatus for wireless communication at a UE is described. The apparatus may include a processor, memory in electronic communication with the processor, and instructions stored in the memory. The instructions may be executable by the processor to cause the apparatus to identify that the UE is configured to transmit via a set of periodic SPS resources on a shared channel accessed in a half-duplex manner, mute transmission of a message during at least one of the SPS resources in order to monitor for transmissions from another device during the at least one SPS resource, detect a transmission from the other device on the shared channel during the at least one SPS resource, and adjust, based on detection of the transmission from the other device during the at least one SPS resource, transmission of the message to a different resource in order to avoid overlapping transmissions from the other device.

Another apparatus for wireless communication at a UE is described. The apparatus may include means for identifying that the UE is configured to transmit via a set of periodic SPS resources on a shared channel accessed in a half-duplex manner, muting transmission of a message during at least one of the SPS resources in order to monitor for transmissions from another device during the at least one SPS resource, detecting a transmission from the other device on the shared channel during the at least one SPS resource, and adjusting, based on detection of the transmission from the other device during the at least one SPS resource, transmission of the message to a different resource in order to avoid overlapping transmissions from the other device.

A non-transitory computer-readable medium storing code for wireless communication at a UE is described. The code may include instructions executable by a processor to identify that the UE is configured to transmit via a set of periodic SPS resources on a shared channel accessed in a half-duplex manner, mute transmission of a message during at least one of the SPS resources in order to monitor for transmissions from another device during the at least one SPS resource, detect a transmission from the other device on the shared channel during the at least one SPS resource, and adjust, based on detection of the transmission from the other device during the at least one SPS resource, transmission of the message to a different resource in order to avoid overlapping transmissions from the other device.

A method for wireless communication at a UE is described. The method may include identifying that the UE is configured for SPS transmissions via a configuration of periodic SPS resources accessed in a half-duplex manner, identifying that the UE is to participate in an SPS resource reselection process to update the configuration of periodic SPS resources, measuring signals indicative of potential interference during one or more subframes that include the periodic SPS resources, identifying, based on the measuring, potential interference on a portion of frequency resources in a subframe of the one or more subframes, and excluding an entirety of the subframe from the SPS resource reselection process based on the potential interference being identified on the portion of frequency resources in the subframe.

An apparatus of wireless communication at a UE described. The apparatus may include a processor, memory in electronic communication with the processor, and instructions stored in the memory. The instructions may be executable by the processor to cause the apparatus to identify that the UE is configured for SPS transmissions via a configuration of periodic SPS resources accessed in a half-duplex manner, identify that the UE is to participate in an SPS resource reselection process to update the configuration of periodic SPS resources, measure signals indicative of potential interference during one or more subframes that include the periodic SPS resources, identify, based on the measuring, potential interference on a portion of frequency resources in a subframe of the one or more subframes, and exclude an entirety of the subframe from the SPS resource reselection process based on the potential interference being identified on the portion of frequency resources in the subframe.

Another apparatus of wireless communication at a UE. The apparatus may include means for identifying that the UE is configured for SPS transmissions via a configuration of periodic SPS resources accessed in a half-duplex manner, identifying that the UE is to participate in an SPS resource reselection process to update the configuration of periodic SPS resources, measuring signals indicative of potential interference during one or more subframes that include the periodic SPS resources, identifying, based on the measuring, potential interference on a portion of frequency resources in a subframe of the one or more subframes, and excluding an entirety of the subframe from the SPS resource reselection process based on the potential interference being identified on the portion of frequency resources in the subframe.

A non-transitory computer-readable medium storing code of wireless communication at a UE. The code may include instructions executable by a processor to identify that the UE is configured for SPS transmissions via a configuration of periodic SPS resources accessed in a half-duplex manner, identify that the UE is to participate in an SPS resource reselection process to update the configuration of periodic SPS resources, measure signals indicative of potential interference during one or more subframes that include the periodic SPS resources, identify, based on the measuring, potential interference on a portion of frequency resources in a subframe of the one or more subframes, and exclude an entirety of the subframe from the SPS resource reselection process based on the potential interference being identified on the portion of frequency resources in the subframe.

DETAILED DESCRIPTION

Figure 1:
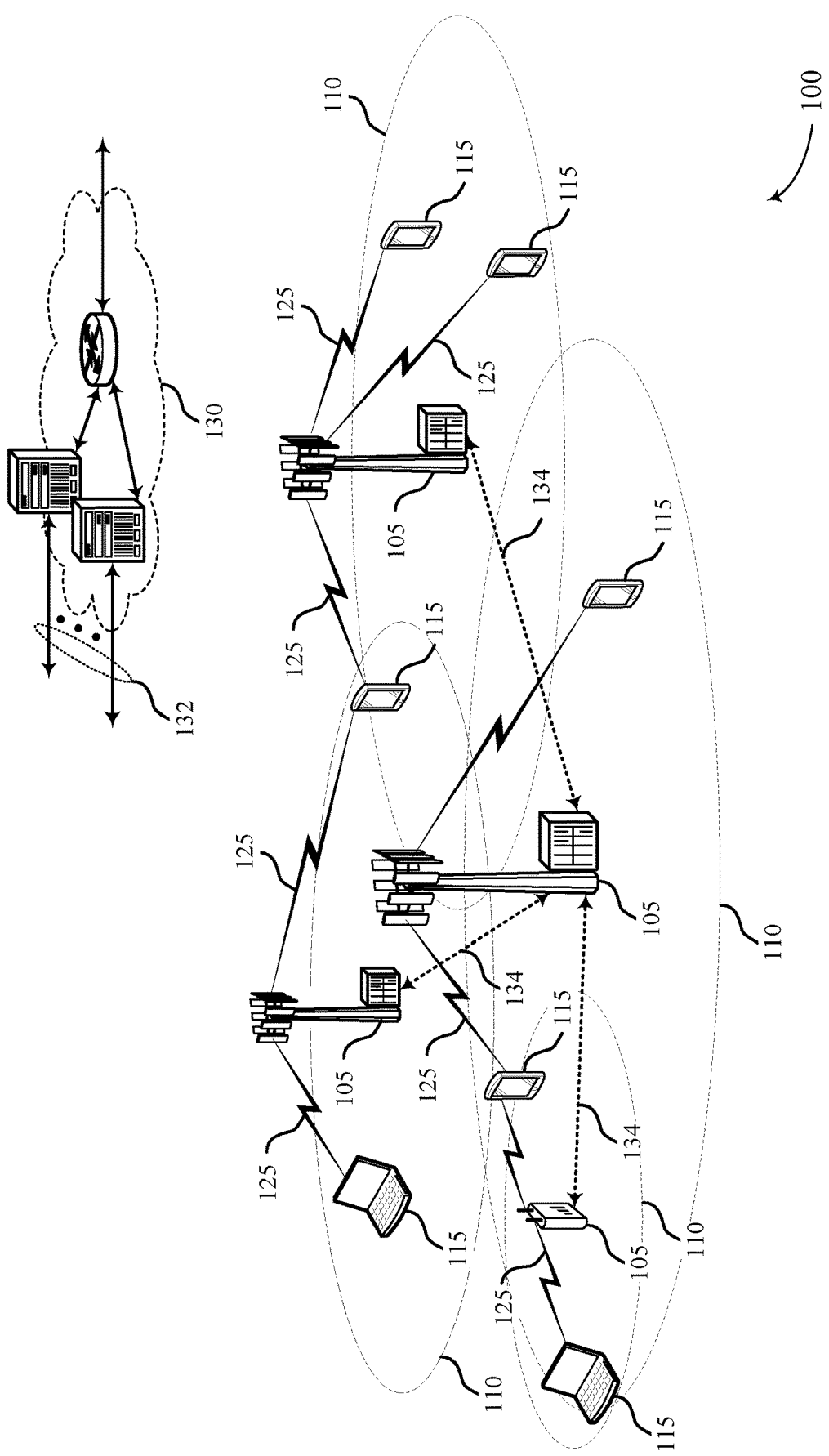
FIG. 1 illustrates an example of a wireless communications system in accordance with aspects of the present disclosure.

In some cases, a user equipment (UE) may operate in a shared channel in which the UE does not receive transmissions from other UEs while the UE is transmitting (e.g., the UE may operate in a half-duplex manner). Such a shared channel may be part of a vehicle-to-everything (V2X) network in a standalone mode (e.g., a cellular V2X (CV2X) network). In some cases, the UE may transmit one or more messages over one or more resources. The resources may span one or more subframes and one or more subchannels and, if they are periodic semi-persistently scheduled (SPS) resources, may repeat according to an SPS period. In some cases, a collision may occur between a message transmitted by the UE and a message transmitted by another device (e.g., another UE). A collision may involve the UE transmitting a message on a resource (e.g., an SPS resource) in the same subframe as a resource of the other device (e.g., another SPS resource). Although the resources may be on different subchannels of the same subframe, interference between the resources may prevent communication to such an extent that the resources are considered to collide. The UE may not detect the collision if the UE lacks a capability to transmit and receive within the subframe. As such, if both the resource of the UE and the resource of the other device are SPS resources, collisions may potentially continue to occur each SPS period without detection (e.g., due to the SPS resource of the UE and the SPS resource of the other device having a same periodicity)

To mitigate the effects of collisions, the UE may perform muting and measuring. For instance, the UE may determine to refrain from transmitting a message during an SPS resource and may instead use the SPS resource for detecting transmissions from other devices. If the UE detects a transmission, the UE may perform a resource reselection process (e.g., the UE may transmit over a different set of SPS resources in future SPS periods). In an SPS period where the UE performs muting and measuring, the UE may transmit the message that was not transmitted during the SPS resource in another resource within the SPS period (e.g., a non-SPS resource).

In some cases, the UE may detect a collision without performing muting and measuring. For instance, if an SPS resource of the UE has a different periodicity than an SPS resource of another device, the UE may be able to determine a collision has occurred without muting. Such a determination may be made if the SPS resources of the UE have a longer periodicity than the SPS resources of the other device, although this may not always be the case. Upon detection of the collision, the device with the higher periodicity (e.g., the UE or the other device) may reselect. In one example, an SPS resource of the UE may repeat once every 4 subframes and an SPS resource of the other device may repeat once every 3 subframes. If a collision occurs at subframe 0, the UE may detect the next transmission from the other device at subframe 3 and determine that a collision has occurred. In some cases, the UE may detect multiple transmissions from the other device (e.g., at subframe 3, 6, and 9) to determine that the periodicity of the transmissions from the other device are such that a collision has occurred at collision subframe. As the UE has the higher SPS resource periodicity, the UE may reselect its SPS resources.

In some cases, the UE may detect collisions via multiple transmissions within the same SPS period. For instance, a UE and/or another device transmitting within the SPS period may transmit and retransmit messages in two or more subframes of the SPS period. If a collision occurs in a first subframe between a message transmitted by the UE and a message transmitted by the other device, the UE may still be able to detect a retransmission of the other device's message in another subframe. In some cases, the UE may determine that the collision has occurred if hybrid automatic repeat request (HARQ) is enabled (e.g., the UE may determine that the retransmission is a retransmission of a message transmitted in the first subframe if HARQ is enabled). Upon detecting the collision, the UE may reselect resources. It should be noted that SPS periods with multiple transmissions from the same device in different subframes may also employ muting and measuring.

During a resource selection or resource reselection process, the UE may choose a set of resources for future transmissions from a set of candidate resources and may report the resources to other devices (e.g., other UEs) or higher layers. Candidate resources may, for instance, be a set of resources on which the UE may transmit and may include available resources and excluded resources. Available resources may be resources that are available to be selected for reporting and/or reselection and excluded resources may be resources that are not available to be selected for reporting and/or reselection. Candidate resources may span one or more subframes and one or more subchannels and, if they are SPS resources, may repeat according to an SPS period.

In some cases, the UE may exclude an entire subframe of candidate resources (including all subchannels of the subframe) if, for example, one of the candidate resources of the subframe is mapped to a resource associated with a transmission from another device. For instance, historically another device may transmit on an SPS resource within a particular subframe each SPS period (e.g., subframes with the same offset from the start of the SPS period). As such, when selecting resources, the UE may exclude an entire subframe of candidate resources corresponding to that particular subframe (e.g., the excluded subframe may have the same offset from the start of an SPS period associated with the candidate resources). This exclusion may be performed even when the other device only transmits on one resource or subchannel of the particular subframe. Additionally or alternatively, the exclusion may be performed based on a measure of the total power associated with the particular subframe (e.g., a received signal strength indicator (RSSI).

In some cases, the UE may alter a probability associated with the frequency that reselection is performed (e.g., probResourceKeep) to mitigate the effects of collisions. A high probability may be associated with delaying resource reselection and a low probability may be associated with performing resource reselection more often. The probability may be adjusted based on a channel busy ratio (CBR), a location of the UE, or a time of day.

In some cases, the UE may randomize resource selection among a set of available resources to prevent collisions. For instance, assuming that all available resources have a power parameter value (e.g., sidelink RSSI (S-RSSI)) associated with them that is lower than a selection threshold, a certain percentage may be chosen randomly from the available resources to be considered for reselection. In other instances, a certain number of available resources may be on or near the boundary of the certain percentage (e.g., a set of available resources with a lower S-RSSI than a chosen selection threshold). In such cases, a number of those available resources on or near the boundary may be chosen at random.

In some cases, the UE may assign equal probabilities to subchannels of the available resources and may choose which of the available resources to report and/or reselect based on splitting the equal probabilities among candidate resources using these subchannels.

Aspects of the disclosure are initially described in the context of a wireless communications system. Examples of collision detection mechanisms, reselection mechanisms, and process flows are then provided to illustrate additional aspects of the disclosure. Aspects of the disclosure are further illustrated by and described with reference to apparatus diagrams, system diagrams, and flowcharts that relate to collision avoidance of half-duplex resource selection.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one mobility management entity (MME), at least one serving gateway (S-GW), and at least one Packet Data Network (PDN) gateway (P-GW). The MME may manage non-access stratum (NAS) (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may also include transmission over a CV2X carrier using a sidelink standard (e.g., PC5), in which UEs 115 may share channel resources and broadcast transmissions to other UEs 115 in the vicinity. Such UEs 115 and the other UEs 115 described herein may support efficient techniques for enabling collision avoidance of half-duplex resource selection. For example, a UE 115 may identify that it is configured to transmit via a set of periodic SPS resources in a shared channel (e.g., a V2X network). The UE 115 may mute transmission of a message during at least one of the SPS resources in order to monitor for transmissions from another device during the at least one SPS resource. The UE 115 may detect a transmission from another device (e.g., another UE 115) in the shared channel during the at least one SPS resource. The UE 115 may adjust, based on the detection of the transmission from the other device during the at least one SPS resource, transmission of the message to a different resource (e.g., a non-SPS resource) in order to avoid overlapping transmissions from the other device.

Additionally or alternatively, the UE 115 may identify that it is configured for SPS transmissions via configuration of periodic SPS resources in a shared channel (e.g., a V2X network). The UE 115 may identify that it is to participate in an SPS resource reselection process to update the configuration of periodic SPS resources. The UE 115 may measure signals indicative of potential interference during one or more subframes that include the periodic SPS resources. The UE 115 may identify, based on the measuring, potential interference on a portion of frequency resources in a subframe of the one or more subframes. The UE 115 may exclude an entirety of the subframe from the SPS resource reselection process based on the potential interference being identified on the portion of frequency resources in the subframe.

Figure 2:
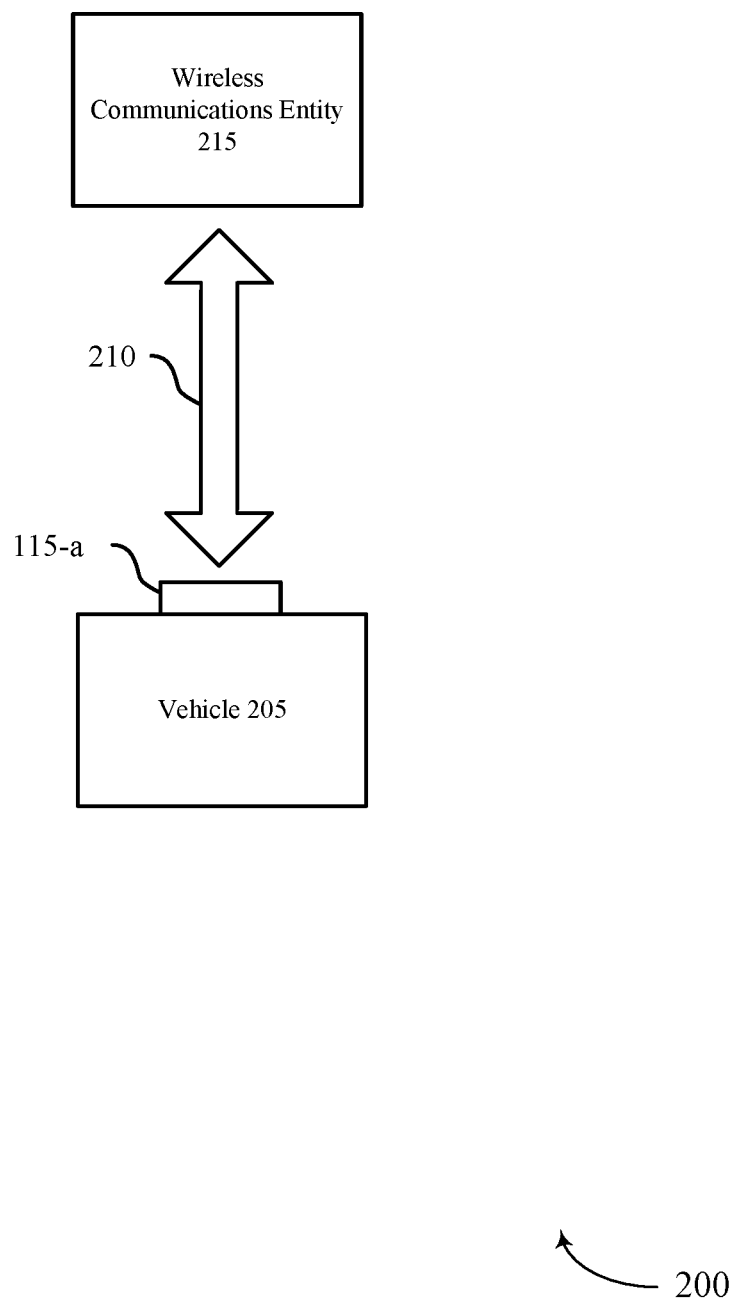
FIG. 2 illustrates an example of a wireless communications system in accordance with aspects of the present disclosure.

FIG. 2 illustrates an example of a wireless communications system 200 in accordance with one or more aspects of the present disclosure. In some examples, wireless communications system 200 may implement aspects of wireless communications system 100. Wireless communications system 200 may include a UE 115-a which may be an example of UEs 115, as described with reference to FIG. 1. Wireless communications system may include one or more vehicles 205. Each of the vehicles 205 may include any mobile vehicle, such as an automobile, a bus, a train, a boat, a ship, a plane, and the like.

Vehicle 205 may include a UE 115-a which may participate in V2X communication (e.g., over communication link 210 with wireless communications entity 215). Such communication may include vehicle-to-infrastructure (V2I) communication, vehicle-to-network (V2N) communication, vehicle-to-vehicle (V2V) communication, vehicle-to-pedestrian (V2P) communication, vehicle-to-device (V2D) communication, and vehicle-to-grid (V2G) communication, among other types of communication. Wireless communications entity 215 may, correspondingly, be an infrastructure entity, a network entity (e.g., a base station 105 or UE 115), another vehicle 205, a pedestrian entity, a device entity, or a grid entity, among other types of entities. UE 115-a may be mounted, integrated, or otherwise attached to vehicle 205.

In some cases, UE 115-a may be a half-duplex system (e.g., UE 115-a may either be transmitting or receiving at a given instance of time). Due to the half-duplex nature of UE 115-a, UE 115-a may not detect transmissions from other devices while UE 115-a is transmitting. Additionally, UE 115-a may transmit on periodic SPS resources which may be associated with an SPS period (e.g., a period after which SPS resources repeat). As such, there may be instances where an SPS resource for a UE 115-a transmission is assigned to a subframe on one subchannel and a resource (e.g., an SPS resource or a non-SPS resource) for another device's transmission (e.g., a transmission of another UE 115) may also be assigned to the same subframe. In such cases, a collision may occur (e.g., multiple transmissions may occur within one subframe), but UE 115-a, as it may be transmitting, may not detect the collision. If both transmit resources (e.g., the resource associated with the transmission of UE 115-a and the resource associated with the transmission of the other device) are SPS resources, each instance of both resources may continue to collide without UE 115-a detecting the collision.

In order to detect collisions, UE 115-a may implement a number of methods that may mitigate the effects of collisions. For instance, UE 115-a may implement a mute and measure mechanism. The mute and measure mechanism may, for instance, mitigate the effects of collision by enabling UE 115-a to detect collisions that may continually occur over multiple SPS periods before any device participating in the collision performs resource reselection. Further, the mute and measure mechanism may enable UE 115-a to transmit a message that may still be received with minimal interference, even when a collision has occurred. Additionally or alternatively, UE 115-a may detect collisions based on detecting transmissions from other devices that are transmitted multiple times in an SPS period. After determining that a collision has occurred, UE 115-a may determine new resources to transmit on. Detecting collisions based on detecting transmissions from other devices that are transmitted multiple times in an SPS period may enable UE 115-a to detect collisions that may continually occur over multiple SPS periods before any device participating in the collision performs resource reselection.

When choosing resources (e.g., initially or during reselection) UE 115-a may implement a number of methods that may limit collisions. For instance, UE 115-a may exclude an entire subframe from the reselection process when a past subframe associated with the subframe to be excluded (e.g., a subframe located in the same offset of the SPS period as the subframe to be excluded) contains a transmission from UE 115-a or from another device. Excluding the entire subframe may limit the possibility that UE 115-a is to transmit in a subframe where other devices are already transmitting. For instance, as those devices may have historically been transmitting in the subframe to be excluded, it is possible that one or more of those devices may still be transmitting in those subframes at a later time. Additionally or alternatively, UE 115-a may select among a certain amount of available resources randomly according to a number of available resources with an equal or approximately equal energy or S-RSSI, or with energy levels or S-RSSI values that are lower than a candidate selection threshold. Selecting among the available resources randomly may prevent UE 115-a from choosing, for instance, the first 20% of available resources with an acceptable S-RSSI value in a given ordering (e.g., an ordering based on a time where an available resource occurs, a frequency where an available resource occurs, or a combination thereof). Additionally or alternatively, each subframe may be associated with a certain probability based on a number of subchannels available for transmission, and resources may be selected based on the probability. Associating each subchannel with an equal probability may reduce a probability that different UEs 115 reselect from the same empty subframe, as opposed to subframes that already have transmissions.

Additionally or alternatively, when choosing resources, UE 115-a may alter a probability associated with the frequency that reselection is performed (e.g., probResourceKeep) to mitigate the effects of collisions. A high probability may be associated with delaying resource reselection and a low probability may be associated with performing resource reselection more often. The probability may be adjusted based on a high CBR. CBR may be a portion of subchannels within a subframe whose S-RSSI measured by a UE 115 exceeds a configured (pre-configured or otherwise) threshold sensed over a set of subframes. CBR may indicate the level of congestion. When CBR is high or a congested scenario occurs (e.g., there are many UEs 115 transmitting and/or receiving within a given area), the probability may become low (e.g., a low probability may be associated with more frequent reselections). When CBR is low, the probability may become high. Additionally or alternatively, the probability may be adjusted based on a location of UE 115-*a* (e.g., if UE 115-*a* is in a traffic jam scenario, the probability may decrease) or a time-of-day (e.g., during rush hour, the probability may decrease). Optimizations may be selectively enabled based on any such of these conditions. Performing reselections more or less often according to the situation may enable UE 115-*a* to get out of collision situations more quickly.

Figure 3:
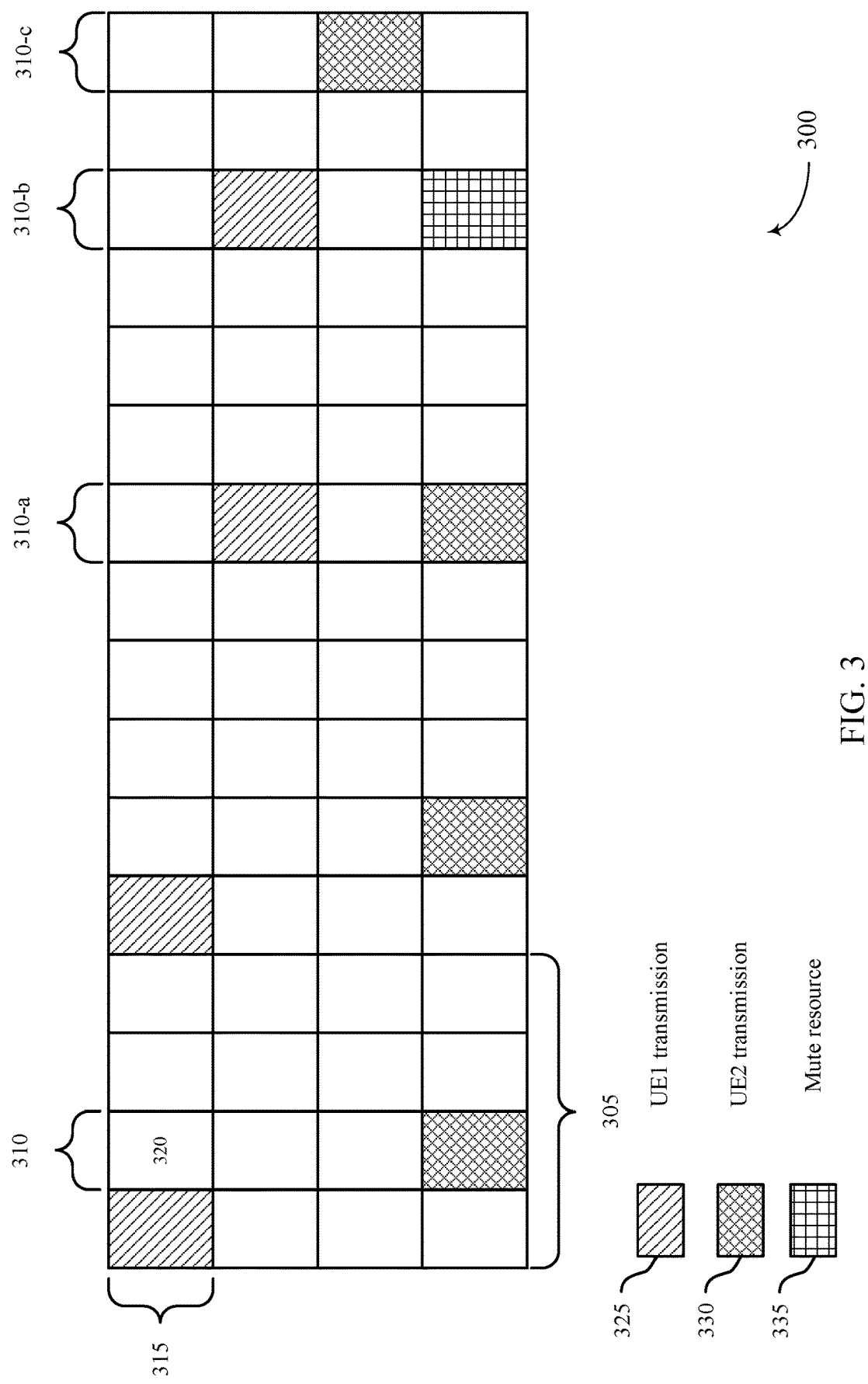
FIG. 3 illustrates an example of a collision detection mechanism in accordance with aspects of the present disclosure.

FIG. 3 illustrates a collision detection mechanism 300 in accordance with one or more aspects of the present disclosure. In some examples, collision detection mechanism 300 may be implemented by aspects of wireless communications system 100 and wireless communications system 200. For instance, collision detection mechanism 300 may be implemented by a UE 115 as described with reference to FIG. 1 and FIG. 2.

Collision detection mechanism 300 may include SPS periods 305. In the case of collision detection mechanism 300, SPS period 305 may have a period of the length of four subframes 310, although shorter or longer SPS periods 305 are possible without deviating from the scope of the present disclosure. Each collision detection mechanism 300 may include subframes 310 that include one or more subchannels 315. In the present example, each subframe 310 may include four subchannels 315 and each SPS period 305 may, correspondingly contain four subframes 310 and four subchannels 315. It should be noted that the number of subchannels or subframes may vary without deviating from the scope of the present disclosure. Each subframe 310 may be associated with a subframe offset according to a number of subframes 310 within a SPS period 305 and a location of a particular subframe 310 with respect to the start of the SPS period 305. For instance, if a SPS period 305 contains N subframes, then an $i_{th}$ subframe of the SPS period 305 may have a offset of i/N*100. For instance, if the SPS period 305 contains 4 subframes, the first subframe 310 may have an offset of 0, the second subframe 310 may have an offset of 25, the third subframe 310 may have an offset of 50, and the fourth subframe 310 may have an offset of 75.

In some cases, a subchannel 315 of a subframe 310 may define a resource 320 which may carry one or more transmissions. In the present example, SPS period 305 may contain 16 resources 320. In general, if there are P subframes 310 and Q subchannels 315 per SPS period 305, there may be PQ resources 320 per SPS period 305. Transmissions carried by resources 320 may include, for instance, a transmission from a first UE 115 (e.g., a UE1 transmission 325) or a transmission from a second UE 115 (e.g., a UE2 transmission 330). In some cases, resources 320 that repeat each SPS period 305 within a same subchannel 315 and with a same subframe offset may be periodic SPS resources. For instance, in the present example, the first UE 115 may initially transmit UE1 transmissions 325 in a first set of SPS resources (e.g., the set of resources 320 of one subchannel 315 and each subframe 310 with a subframe offset of 0) and the second UE 115 may initially transmit UE2 transmissions 330 in a second set of SPS resources (e.g., the set of resources 320 within another subchannel 315 and each subframe 310 with a subframe offset of 25).

Within subframe 310-*a*, a UE1 transmission 325 may collide with a UE2 transmission 330 (e.g., an SPS resource of the first UE 115 may be in the same subframe 310 as an SPS resource of the second UE 115). The collision may, for instance, be prompted by the first UE 115 reselecting from a subframe 310 with a first subframe offset (e.g., a subframe offset of 0) to a subframe 310 with a same offset as subframes 310 associated with SPS resources of the second UE 115 (e.g., an offset of 25), which may include subframe 310-*a*. In cases where the second UE 115 is performing as a half-duplex system, the second UE 115 may not detect the UE1 transmission 325 of subframe 310-*a*. As a result, the second UE 115 may not determine that a collision has occurred.

Within subframe 310-*b*, the second UE 115 may determine to perform muting and measuring. Muting may involve, for instance, the second UE 115 refraining from transmitting a UE2 transmission 330 within an SPS resource of subframe 310-*b*. Measuring may involve the second UE 115 detecting whether or not another device (e.g., the first UE 115) is transmitting within subframe 310-*b*. In some cases, measuring may occur during an originally scheduled wake-up for the SPS resource of the second UE 115 within subframe 310-*b*. In the present example, the second UE 115 may be able to detect a UE1 transmission 325 of subframe 310-*b* based on refraining from transmitting (e.g., muting) and instead detecting signals (e.g., measuring). If the second UE 115 determines a collision has occurred (e.g., based on detecting the UE1 transmission 325 of subframe 310-*b*) or detects high energy or total received power (e.g., RSSI) within subframe 310-*b*, resource reselection for subsequent and/or future SPS periods 305 may be triggered. It should be noted that the first UE 115 may, additionally or alternatively, perform muting and measuring.

In some cases, when the second UE 115 is performing muting, the second UE 115 may transmit a UE2 transmission 330 within an SPS resource of subframe 310-*b* if transmitting the UE2 transmission 330 does not prohibit or completely compromise the second UE 115 from performing measuring. Muting in such cases may involve the second UE 115 modifying or altering the UE2 transmission 330 (e.g., a transmit power of the transmission) such that the second UE 115 is permitted to perform measurements during subframe 310-*b*. In other words, while in some cases, muting may refer to the second UE 115 electing to skip a scheduled transmission in order to perform measuring, in other cases when the UE is capable, muting may refer to the second UE 115 modifying or altering the UE2 transmission 330 so as to still allow for measuring by the UE second UE 115.

A decision of whether or not to mute and measure a subframe 310 may be triggered and may be made, for instance, based on a probability. The probability of muting may, for instance, be based on choosing a certain percentage of a total number of reserved SPS resources for muting. For example, if the second UE 115 has received a grant reserving SPS resources over 20 SPS periods 305 (e.g., one SPS resource for each SPS period 305), a certain percentage of those resources (e.g., 5%, or 1 SPS resource in the present example) may be used for muting and measuring. The probability may be adjusted based on a certain number of factors. For instance, a higher speed of travel of the second UE 115 may, for instance, increase the probability of muting a SPS resource. Additionally or alternatively, a higher congestion level (e.g., CBR) may increase the probability of muting the SPS resource. In some cases, muting and measuring may be triggered in a subsequent or future SPS resource by the speed associated with the second UE 115 or the congestion level reaching above a threshold speed and/or congestion level value, respectively. It should be noted that the muting probability and/or the muting scheme may be chosen that the first and second UEs 115 are less likely to mute simultaneously. For instance, the first and second UEs 115 may have a one in four probability of muting within each of the first four transmit opportunities.

Additionally or alternatively, the second UE 115 may increase the probability of or may trigger muting and measuring based on determining that a periodic SPS transmission associated with the first UE 115 (e.g., a UE1 transmission 325) has seemingly disappeared altogether. For instance, the second UE 115 may detect SPS transmissions associated with the first UE 115 (e.g., UE1 transmissions 325) over multiple SPS periods 305 at a particular subframe offset (e.g., offset of 0) before the SPS period 305 containing subframe 310-*a*. However, during the SPS period 305 containing subframe 310-*a*, the second UE 115 may not detect SPS transmissions associated with the first UE 115 (e.g., due to the second UE 115 transmitting UE2 transmission 330 and the first UE 115 transmitting UE1 transmission 325 within subframe 310-*a*). As such, the second UE 115 may increase the probability of muting and measuring or may trigger the process of muting and measuring in a subsequent or future SPS period 305 (e.g., within subframe 310-*b*). Additionally or alternatively, the UE 115 (e.g., between the first UE 115 and the second UE 115) with the lower layer address may have a higher probability of performing muting.

Within subframe 310-*c*, the second UE 115 may transmit UE2 transmission 330. UE2 transmission 330 may be transmitted over a resource 320 that is a non-SPS resource and may be associated with the UE2 transmission 330 that may have otherwise been transmitted over mute resource 335 if muting and measuring had not occurred. The UE2 transmission 330 in subframe 310-*c* may occur regardless of the second UE 115 detecting that a collision has occurred or may occur based on the second UE 115 detecting that a collision has occurred.

It should be noted that a UE 115 may perform the methods described herein without using scheduling information. For instance, in other methods a UE 115 may receive scheduling information from a base station 105 and may determine if a collision is imminent based on the scheduling information. However, such methods may rely on the UE 115 having access to scheduling information and identifying, from the scheduling information, each possible source of a collision. However, even assuming that the UE 115 receives scheduling information, the scheduling information may not indicate the communication activity for each nearby device from which the UE may detect transmissions. For instance, in a congested traffic situation the UE 115 may encounter transmissions from a wireless device whose communication activity was not indicated by the scheduling information. Performing the methods described herein may not involve the UE 115 relying on scheduling information and may enable the UE 115 to detect transmissions that scheduling information may fail to indicate.

The methods as described herein may enable a UE 115 to adapt in situations where the UE 115 has a heightened risk of encountering changing channel conditions with little or no notice (e.g., due to the UE 115 moving into and out of areas of congested traffic). Additionally, the methods as described herein may differ from other methods such as LBT. LBT may, for instance, involve a UE 115 detecting signals over a variable time and may enable a UE 115 to determine whether a message may be transmitted over a channel at a given time. The methods described herein, meanwhile, may involve the UE 115 performing measuring specifically over a time spanned by an SPS resource and may enable the UE 115 to determine if the UE 115 is to perform a resource reselection procedure.

Figure 4:
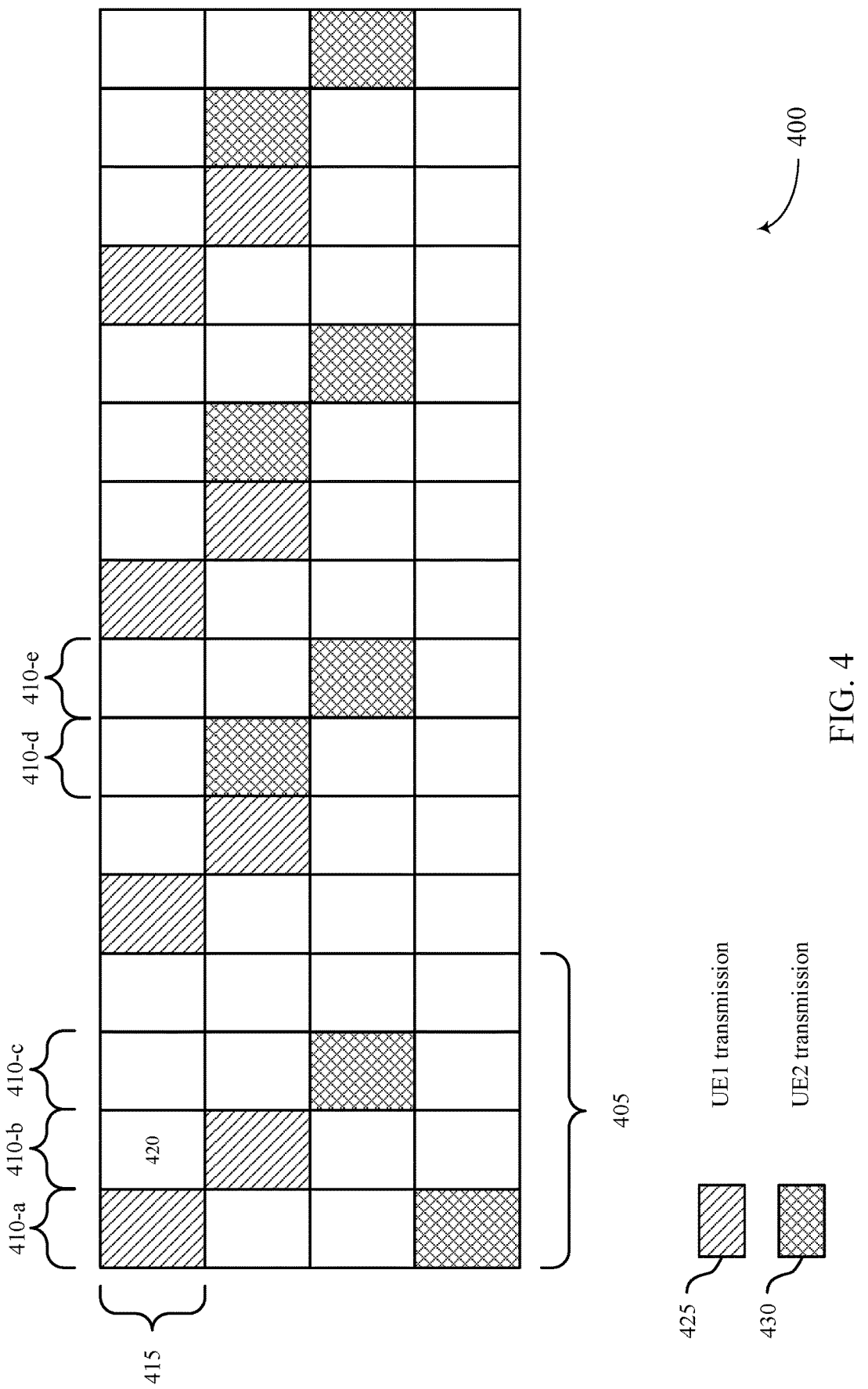
FIG. 4 illustrates an example of a collision detection mechanism in accordance with aspects of the present disclosure.

FIG. 4 illustrates a collision detection mechanism 400 in accordance with one or more aspects of the present disclosure. In some examples, collision detection mechanism 400 may be implemented by aspects of wireless communications systems 100 and 200 and collision detection mechanism 300. For instance, collision detection mechanism 300 may be implemented by a UE 115 as described with reference to FIGS. 1-3.

Collision detection mechanism 400 may include SPS periods 405. In the case of collision detection mechanism 400, SPS period 405 may have a period of four subframes, although shorter or longer SPS periods 405 are possible without deviating from the scope of the present disclosure. Each collision detection mechanism 400 may include subframes 410 that include one or more subchannels 415. In the present example, each subframe 410 may include four subchannels 415 and each SPS period 405 may contain four subframes 410 and four subchannels 415. Each subframe 410 may be associated with an offset according to a number of subframes 410 within a SPS period 405. For instance, if a SPS period 405 contains N subframes, then an $i_{th}$ subframe of the SPS period 405 may have a offset of i/N*100. In the present example, the SPS period 405 may contain 4 subframes 410, the first subframe 410 may have an offset of 0, the second subframe 410 may have an offset of 25, the third subframe 410 may have an offset of 50, and the fourth subframe 410 may have an offset of 75.

In some cases, a subchannel 415 of a subframe 410 may define a resource 420 which may carry one or more transmissions. Such transmissions may include, for instance, a transmission from a first UE 115 (e.g., a UE1 transmission 425) or a transmission from a second UE 115 (e.g., a UE2 transmission 430). In some cases, resources 420 that repeat within a same subchannel and within a same subframe offset may be periodic SPS resources. For instance, in the present example, the first UE 115 may initially transmit UE1 transmissions 425 in a first set of SPS resources (e.g., the set of resources 420 including resources 420 within a first subchannel 415 and subframes 410 with offset 0 and resources 420 within a second subchannel 415 and subframes 410 with a subframe offset 25) and the second UE 115 may initially transmit UE2 transmissions 430 in a second set of SPS resources (e.g., the set of resources 420 including resources 420 within a third subchannel 415 and subframes 410 with subframe offset 50 and resources 420 within a fourth subchannel 415 and subframes 410 with a subframe offset 0). It should be noted that although both the first UE 115 and the second UE 115 are transmitting over two subframes 410 per SPS period 405, the first UE 115 and/or the second UE 115 may each transmit over a variable number of subframes 410 per SPS period 405 without deviating from the scope of the present disclosure.

Within subframe 410-*a*, a UE1 transmission 425 may collide with a UE2 transmission 430 (e.g., an SPS resource of the first UE 115 may be in the same subframe 410 as an SPS resource of the second UE 115). In cases where the second UE 115 is performing as a half-duplex system, the second UE 115 may not detect the UE1 transmission 425 of subframe 410-*a*. As a result, the second UE 115 may not detect that a collision has occurred.

Within subframe 410-*b*, the first UE 115 may transmit another UE1 transmission 425 (e.g., a retransmission of the UE1 transmission 425 in subframe 410-*a*). Both the UE1 transmission 425 of subframe 410-*a* and the UE1 transmission 425 of subframe 410-*b* may be SPS resources and may both be transmitted each SPS period 405. The second UE 115 may detect and decode the UE1 transmission 425 in subframe 410-*b* and may, based on the decoding, determine that a collision has occurred between UE1 transmission 425 and UE2 transmission 430 within subframe 410-a. The second UE 115 may determine a collision has occurred based on HARQ being enabled, as HARQ being enabled may enable the second UE 115 to recognize the UE1 transmission 425 of subframe 410-b as a retransmission.

Within subframe 410-c, the second UE 115 may transmit another UE2 transmission 430 (e.g., a retransmission of the UE2 transmission 430 in subframe 410-a). Both the UE2 transmission 430 of subframe 410-a and the UE1 transmission 425 of subframe 410-b may be SPS resources and may both be transmitted each SPS period 405. The first UE 115 may detect and decode the UE2 transmission 430 and may, based on the decoding, determine that a collision has occurred between UE1 transmission 425 and UE2 transmission 430 within subframe 410-a. The first UE 115 may determine a collision has occurred based on HARQ being enabled.

After detecting that the collision has occurred, the second UE 115 may reselect SPS resources for future SPS periods 405 and may transmit future UE2 transmissions 430 on the new SPS resources. For instance, the new SPS resources may be located in subframes 410 with a subframe offset 50 and subframes 410 with a subframe offset 75 (e.g., subframe 410-d and subframe 410-e). In the present example, the first UE 115 may not reselect SPS resources (e.g., the first UE 115 may determine that the second UE 115 has reselected SPS resources or may determine, based on a probability, to not reselect SPS resources). However, there may be instances where the first UE 115 does reselect. Reselecting resources may prevent future collisions.

In some cases, collision detection mechanism 400 may implement a muting and measuring system. For instance, a UE 115 may alternate between muting a first transmission (e.g., a transmission or retransmission) within SPS period 405 and muting a second transmission (e.g., a transmission or retransmission) within a subsequent or future SPS period 405. As with regards to FIG. 3, upon detecting a collision via muting and measuring, the transmission (e.g., the first transmission, the second transmission, or both) that was to be transmitted during a subframe 410 may be transmitted in another subframe 410 within the same SPS period 405 as the muting subframe 410. Further, detection of the collision may trigger a reselection process.

Figure 5:
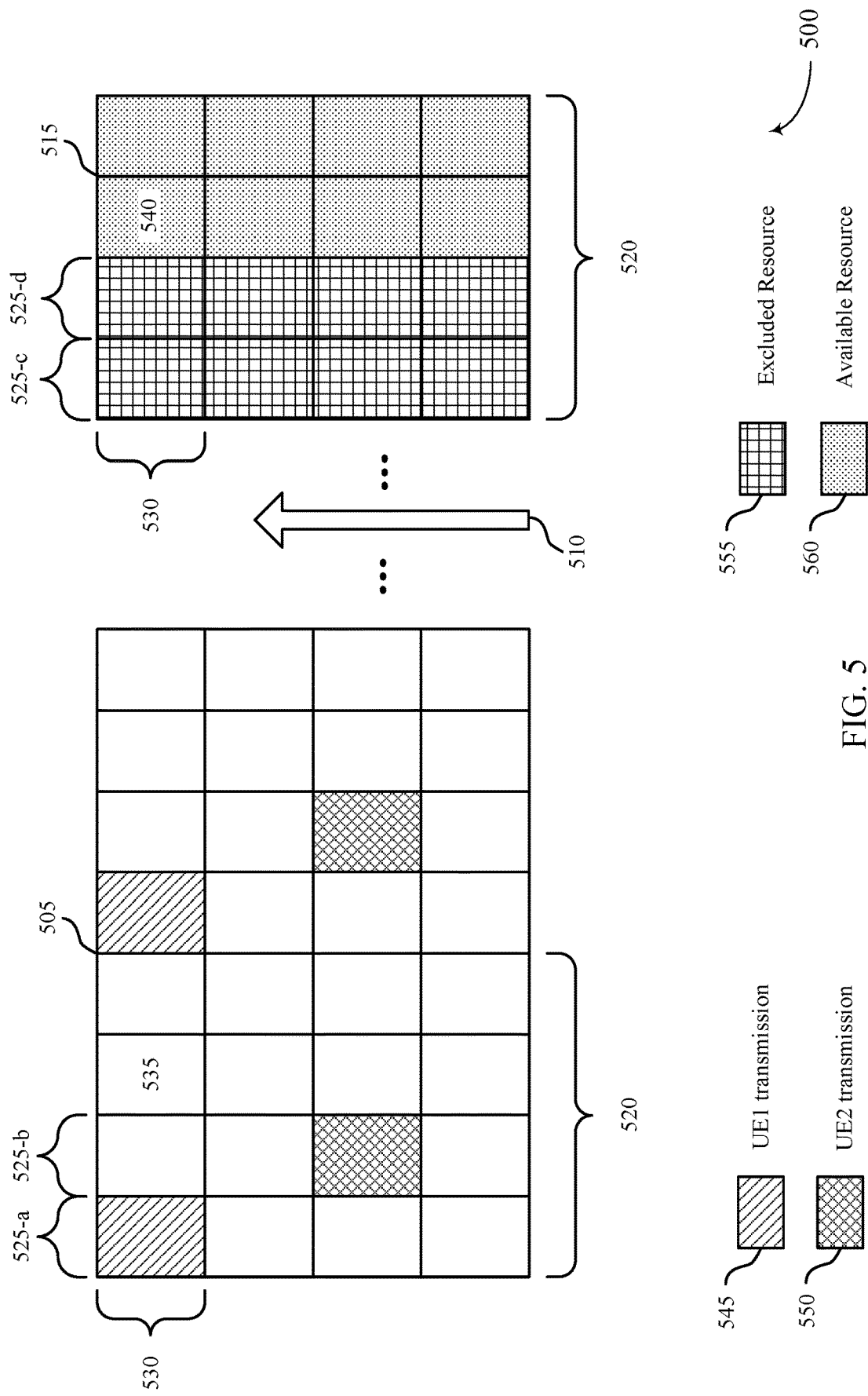
FIG. 5 illustrates an example of a reselection mechanism in accordance with aspects of the present disclosure.

FIG. 5 illustrates a reselection mechanism 500 in accordance with one or more aspects of the present disclosure. In some examples, reselection mechanism 500 may be implemented by aspects of wireless communications systems 100 and 200. For instance, reselection mechanism 500 may be implemented by a UE 115 as described with reference to FIGS. 1 and 2.

Reselection mechanism 500 may include communication pattern 505, resource grant request 510 and resource candidates pattern 515. Communication pattern 505 may represent communications undertaken by multiple devices (e.g., a first UE 115 and a second UE 115) prior to the resource grant request 510. The resource grant request 510 may represent a grant from a device (e.g., the second UE 115) requesting for more resources. The resource grant request 510 may request for resources starting from a certain time after the resources are requested (e.g., fewer than or equal to four subframe lengths after the resource grant request 510 is sent) to a certain time after resources are requested (e.g., 20 to 100 subframes after the resource grant request 510 is sent). In some cases, the start subframe and end subframe may be chosen according to a number of SPS periods 520 (e.g., if an SPS period 520 is the length of four subframes 525, the difference between the start subframe index and the index of the subframe after the end subframe may be a multiple of four). Resource candidates pattern 515 may represent candidate resources 540 that a device (e.g., the second UE 115) may choose from for future transmissions (e.g., SPS transmissions).

The communication pattern 505 may include SPS periods 520. In the case of reselection mechanism 500, SPS periods 520 may have a period of four subframes 525, although shorter or longer SPS periods 520 are possible without deviating from the scope of the present disclosure. Each communication pattern 505 may include subframes 525 that include one or more subchannels 530. In the present example, each subframe 525 may include four subchannels 530 and each SPS period 520 may contain four subframes 525 and four subchannels 530, although lower or higher numbers of subframes 525 and/or subchannels 530 may be used without deviating from the scope of the present disclosure. Each subframe 525 may be associated with an offset according to a number of subframes 525 within a SPS period 520. For instance, if an SPS period 520 contains N subframes, then an subframe of the SPS period 305 may have a offset of $i/N*100$. For instance, if the SPS period 520 contains four subframes 525, the first subframe 525 may have an offset of 0, the second subframe 525 may have an offset of 25, the third subframe 525 may have an offset of 50, and the fourth subframe 525 may have an offset of 75.

A subchannel 530 of a subframe 525 may define a resource 535 which may carry one or more transmissions. Such transmissions may include, for instance, a transmission from a first UE 115 (e.g., a UE1 transmission 545) or a transmission from a second UE 115 (e.g., a UE2 transmission 550). In some cases, resources 535 that repeat within a same subchannel 530 and with a same subframe offset may be periodic SPS resources. For instance, in the present example, the first UE 115 may initially transmit UE1 transmissions 545 in a first set of SPS resources (e.g., the set of resources 535 including resources 535 within a first subchannel 530 and subframes 525 with subframe offset 0) and the second UE 115 may initially transmit UE2 transmissions 550 in a second set of SPS resources (e.g., the set of resources 535 including resources 535 within another subchannel 530 and subframes 525 with subframe offset 25).

The resource candidates pattern 515 may be similarly structured to communication pattern 505. For instance, resource candidates pattern 515 may also have SPS periods 520, subframes 525, and subchannels 530. Although only one SPS period 520 is shown in the present example, it should be noted that other examples of resource candidates pattern 515 may include multiple SPS periods 520. A subchannel 530 of a subframe 525 may define a candidate resource 540 of resource candidates pattern 515. In some cases, a candidate resource 540 may be determined to be an SPS resource (e.g., if resource candidates pattern 515 have multiple SPS periods 520, each candidate resource 540 may repeat according to SPS period 520). Each candidate resource 540 may be an excluded resource 555 or an available resource 560. An excluded resource 555 may be a candidate resource 540 that the UE 115 performing reselection (e.g., the second UE 115) has determined to not consider for reselection. An available resource 560 may be a candidate resource 540 that the UE 115 performing reselection (e.g., the second UE 115) has determined to consider for reselection. In some cases, candidate resources 540 which are not excluded resources 555 may automatically be considered available resources 560.

Upon transmitting the resource grant request 510, the UE 115 performing reselection (e.g., the second UE 115) may decide which candidate resources 540 are excluded resources 555 and which candidate resources 540 are available resources 560. For instance, the UE 115 may exclude a subframe 525 of resource candidates pattern 515 and mark all of its candidate resources 540 as excluded resources 555 if the subframe 525 has the same subframe offset as a subframe 525 of communication pattern 505 in which the UE 115 transmits. For instance, for the second UE 115 to perform resource selection, the second UE 115 may exclude subframe 525-*d* from reselection, as subframe 525-*d* of resource candidates pattern 515 may have the same subframe offset (e.g., an offset of 25) as subframe 525-*b* of communication pattern 505, which may be a subframe 525 in which the second UE 115 transmits.

Additionally or alternatively, the UE 115 may exclude a subframe 525 of resource candidates pattern 515 and mark all of its candidate resources 540 as excluded resources 555 if the subframe 525 has the same subframe offset as a subframe 525 of communication pattern 505 in which another device (e.g., another UE 115) transmits. For instance, for the second UE 115 to perform resource selection, the second UE 115 may exclude subframe 525-*c* from reselection, as subframe 525-*c* of resource candidates pattern 515 may have the same subframe offset (e.g., an offset of 0) as subframe 525-*a* of communication pattern 505, which may be a subframe 525 in which the first UE 115 transmits.

In general, two periodic resources (e.g., resources 535) may be considered to overlap if their periodicities and subframe offsets enable them to overlap periodically. For example, two periodic resources may have the same subframe offset (e.g., both resources may have a subframe offset of 0) for a given SPS period 520. However, if the two periodic resources have different periodicities (e.g., only one of the resources repeat according to the given SPS period 520), the two periodic resources may not collide in the next SPS period 520. Additionally, if two periodic resources have the same periodicities but have different subframe offsets (e.g., one has a subframe offset of 0 and one has a subframe offset of 25), a collision may not occur. However, in the case where the two periodic resources have different periods, collisions may still occur periodically (e.g., if a first periodic resource has a period of 2 subframes and a second periodic resource has a period of 3 subframes, the first periodic resource and the second periodic resource may collide every 6 subframes). As such, the schemes described herein may apply when separate resources have distinct periodicities.

In some cases, a decision to exclude the entire subframe 525, none of it, or just a portion of it (e.g., just the candidate resource 540 associated with a resource 535 in which transmission occurs) may depend on a reference signal received power (RSRP) or RSSI value associated with the subframe 525 to potentially be excluded. For instance, if the RSRP of the subframe 525 of communication pattern 505 is smaller than a first threshold value, none of the candidate resources 540 of the corresponding subframe 525 may be excluded. If the RSRP of the subframe 525 of communication pattern 505 is larger than another threshold value (e.g., a threshold value larger than the first, which may be larger by 3 decibels (dB)), the entire subframe 525 may be excluded. If the RSRP of the subframe 525 of communication pattern 505 is larger than the first threshold value but smaller than the other threshold value, only the candidate resources 540 associated with resources 535 within the subframe 525 of communication pattern 505 where transmissions occurs may be excluded. In some cases, only one of these thresholds may be used.

Additionally or alternatively, the UE 115 may rank subframes 525 of communication pattern 505 according to power or energy parameter values (e.g., averaged subchannel RSSI or total received power of each subframe 525) and may choose a certain percentage of subframes 525 of resource candidates pattern 515 to exclude based on the ranking. For instance, the UE 115 may first use a 1-second RSSI per subchannel history and may average the RSSIs using a fixed periodicity (e.g., 100 ms) across each subchannel to derive subchannel averaged RSSI for each subframe. Upon deriving the averaged subchannel RSSI, the subframes 525 of communication pattern 505 may be ranked. Each subframe 525 of communication pattern 505 may have the same offset as a subframe 525 of resource candidates pattern 515. As such, a certain percentage (e.g., 30%) of subframes 525 of resource candidates pattern 515 may be excluded from reselection if their corresponding subframes 525 of communication pattern 505 (e.g., subframes 525 of communication pattern 505 with the same subframe offset as subframes 525 of resource candidates pattern 515) are in the certain percentage of subframes 525 with least desirable power or energy parameters values (e.g., highest RSSIs or total received power across all subchannels).

In some cases, the UE 115 may exclude a subframe 525 of resource candidates pattern 515 and mark all of its candidate resources 540 as excluded resources 555 if the subframe 525 has the same subframe offset as one or more subframes 525 of communication pattern 505 whose averaged subchannel RSSI is above a threshold.

In some cases, one or more of the methods disclosed herein (e.g., performing reselection based on previous transmissions from the UE 115 performing reselection, transmissions from other UEs 115, ranking subframes 525 of communication pattern 505 according to power or energy parameter values, or averaged subchannel RSSI values) may be performed based on a certain percentage (e.g., 50%) of candidate resources 540 being identified as available resources 560 after performing RSRP-based resource exclusion. RSRP-based resource exclusion may involve, for example, identifying individual candidate resources 540 as excluded resources 555 and may enable a UE 115 to avoid previously detected SPS transmissions based on an announced periodicity (e.g., within an SA) and the last transmission time. The methods disclosed herein may apply to resources 330 of communication pattern 505 associated with transmissions and also resources 330 of communication pattern 505 unassociated with transmissions.

In some cases, each UE 115 may transmit within a SPS period 520 during multiple subframes 525 (e.g., HARQ-based transmissions) of an SPS period 520. In such cases, if a first subframe 525 of resource candidates pattern 515 is determined by a UE 115 to be excluded, both the first subframe 525 and a second subframe 525 of resource candidates pattern 515 may be excluded. The first subframe 525 may, for instance, correspond to a first subframe 525 of communication pattern 505 with the same offset as the subframe 525 of resource candidates pattern 515 to be excluded and the second subframe 525 may, for instance, correspond to a second subframe 525 of communication pattern 505. The first subframe 525 may be associated with a transmission (e.g., a UE1 transmission 540) and the second subframe 525 may be associated with a retransmission of the transmission (e.g., a retransmission of the UE1 transmission 545). In other cases, one of the first subframe 525 or the second subframe 525 may be excluded (e.g., overlap may be allowed such that one of transmission and retransmission do not overlap with an excluded resource 555).

Figure 6A:
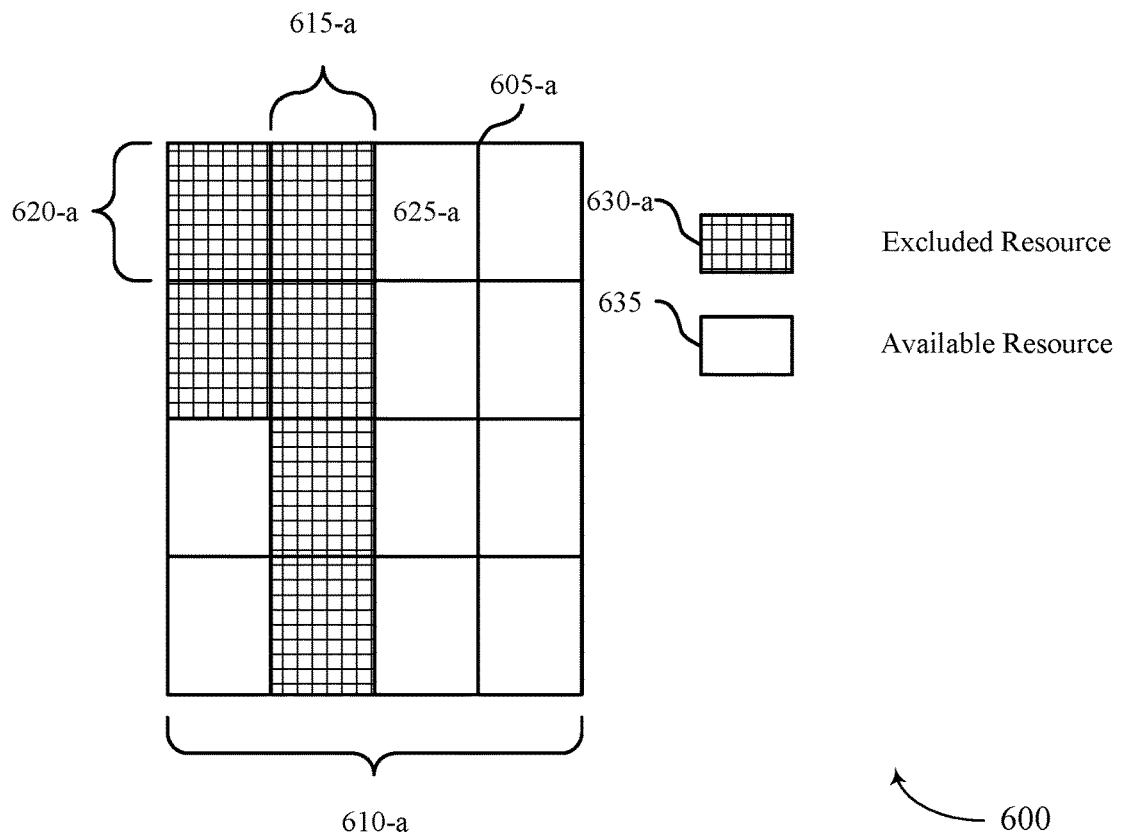
FIGS. 6A and 6B illustrate examples of reselection mechanisms in accordance with aspects of the present disclosure.

FIG. 6A illustrates a reselection mechanism 600 in accordance with one or more aspects of the present disclosure. In some examples, reselection mechanism 600 may be implemented by aspects of wireless communications systems 100 and 200 and reselection mechanism 500. For instance, reselection mechanism 600 may be implemented by a UE 115 as described with reference to FIGS. 1, 2, and/or 5. Reselection mechanism 600 may include resource candidates pattern 605-a, which may be an example resource candidates pattern 515 with respect to FIG. 5; an SPS period 610-a, which may be an example of an SPS period 520 with respect to FIG. 5, subframes 615-a, which may be an example of subframes 525 with respect to FIG. 5; subchannels 620-a, which may be an example of subchannels 530 with respect to FIG. 5; candidate resources 625-a, which may be an example of candidate resources 540 with respect to FIG. 5; excluded resources 630-a, which may be an example of excluded resources 555 with respect to FIG. 5; and available resources 635, which may be an example of available resources 560 with respect to FIG. 5.

During a reselection process, a number of candidate resources 625-a (e.g., six in the present example) may be excluded resources 630-a. They may be excluded, for example, based on the methods disclosed within FIG. 5 or may be excluded through other methods (e.g., individual candidate resources 625-a may be excluded). Of the candidate resources 625-a, a certain percentage may be chosen for reporting and/or reselection, each of which may be an available resource 635-a. For example, 25% of the available resources 635 may be chosen for reporting and/or reselection. It should be noted that while 25% is being used as the threshold in the present example, other threshold values may be used without deviating from the scope of the present disclosure.

In some cases, a UE 115 may select candidate resources 625-a to report and/or reselect based on an RSSI value (e.g., an S-RSSI) associated with each candidate resource 625-a. For instance, each candidate resource 625-a may be associated with a resource from previous transmissions (e.g., with the same SPS period 610-a) that have corresponding RSSI values associated with them. Candidate resources 625-a associated with resources that have correspondingly low RSSI values may be more likely to be chosen than candidate resources 625-a associated with resources that have correspondingly high RSSI values. However, in some cases, all candidate resources 625-a may have the same RSSI value. In such cases, the percentage (e.g., 25%) of candidate resources 625-a to report and/or reselect from may be chosen randomly among the available resources 635-a (e.g., four available resources 635-a, or 25% of 16 candidate resources 625-a may be chosen, of which one may be chosen randomly for transmitting messages).

Figure 6B:
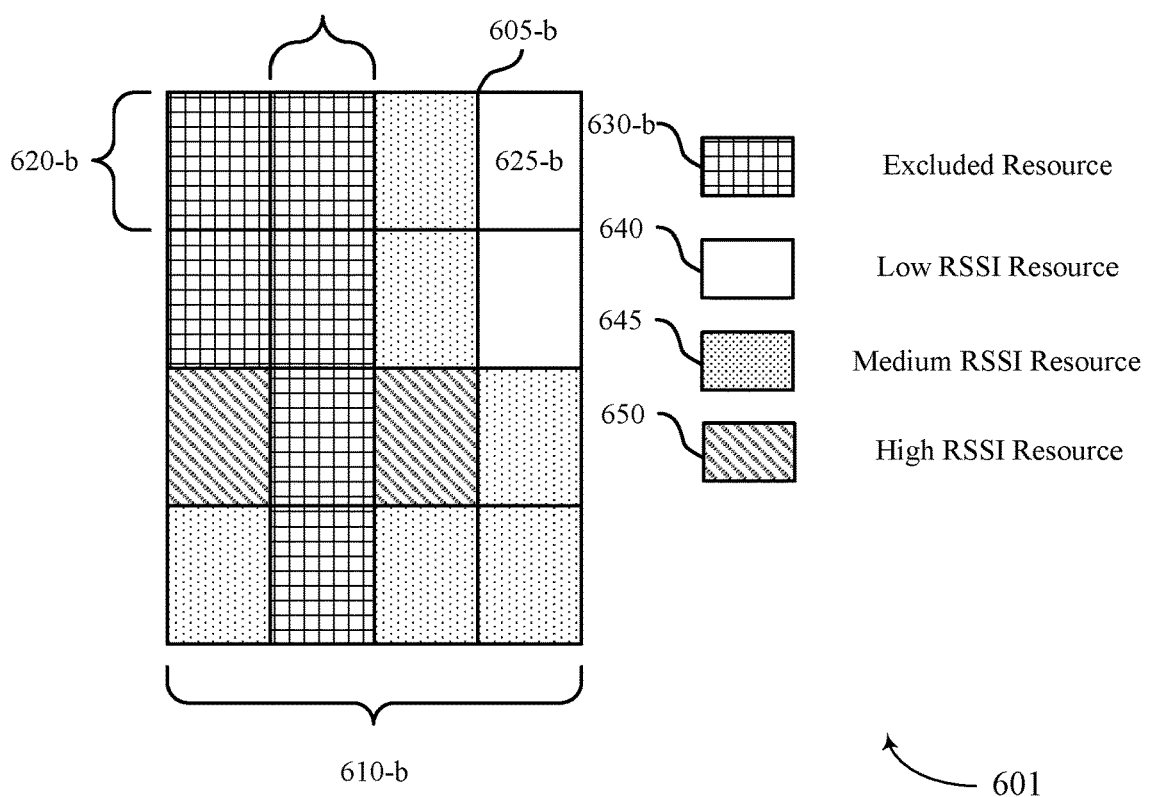

FIG. 6B illustrates a reselection mechanism 601 in accordance with one or more aspects of the present disclosure. In some examples, reselection mechanism 601 may be implemented by aspects of wireless communications systems 100 and 200 and reselection mechanism 500. For instance, reselection mechanism 601 may be implemented by a UE 115 as described with reference to FIGS. 1, 2, and/or 5. Reselection mechanism 601 may include resource candidates pattern 605-b, which may be an example resource candidates pattern 515 with respect to FIG. 5; an SPS period 610-b, which may be an example of an SPS period 520 with respect to FIG. 5, subframes 615-b, which may be an example of subframes 525 with respect to FIG. 5; subchannels 620-b, which may be an example of subchannels 530 with respect to FIG. 5; candidate resources 625-b, which may be an example of candidate resources 540 with respect to FIG. 5; excluded resources 630-b, which may be an example of excluded resources 555 with respect to FIG. 5. FIG. 6B may further include low RSSI resources 640, medium RSSI resources 645, and high RSSI resources 650 which may be subsets of available resources 635 as described with reference to FIG. 6A.

During a reselection process, a number of candidate resources 625-b (e.g., six in the present example) may be excluded resources 630-b. They may be excluded, for example, based on the methods disclosed within FIG. 5 or may be excluded through other methods (e.g., individual candidate resources 625-b may be excluded). Of the total candidate resources 625-b, only a certain percentage (e.g., 25%) may be chosen for reporting and/or reselecting. Such chosen candidate resources may all be available resources (e.g., low RSSI resources 640, medium RSSI resources 645, and/or high RSSI resources 650).

In some cases, a UE 115 may select candidate resources 625-b to report and/or reselect based on an RSSI value (e.g., an S-RSSI) associated with each candidate resource 625-b. For instance, each candidate resource 625-b may be associated with a resource from previous transmissions (e.g., with the same SPS period 610-b) that have corresponding RSSI values associated with them. Candidate resources 625-b associated with resources that have correspondingly low RSSI values (e.g., low RSSI resources 640) may be more likely to be chosen than candidate resources 625-b associated with resources that have correspondingly high RSSI values (e.g., high RSSI resources 650).

In some cases, some candidate resources 625-b that are non-excluded may have an RSSI value lower than a threshold (e.g., low RSSI resources 640) or an RSSI value higher than another threshold (e.g., high RSSI resources 650). Additionally, some candidate resources 625-b that are non-excluded may have RSSI values that are higher than the low RSSI threshold but lower than the high RSSI threshold (e.g., medium RSSI resources 645). Low RSSI resources 640 may be chosen for reselection first (i.e., available resources with the highest priority), then medium RSSI resources 645 (i.e., available resources with the next highest priority), and then high RSSI resources 650 (i.e., available resources with the lowest priority). In cases where the sum total of available resources with a particular priority and those with higher priorities (e.g., the priority of medium RSSI resources 645 and low RSSI resources 640) exceed the percentage of candidate resources 625-b that are to be chosen for reporting and/or reselection, the available resources from higher priorities may be automatically chosen and the available resources of the particular priority may be chosen among randomly to reach the percentage. For example, if the percentage is 25% and there are 16 candidate resources 625-b, 4 available resources may be chosen. The total number of low RSSI resources 640 may be below the number of available resources to be chosen. The total number of low RSSI resources 640 and medium RSSI resources 645, however, may be 8, which may be greater than the number of available resources to be chosen. As such, each of the low RSSI resources 640 may be chosen and 2 of the 6 medium RSSI resources 645 may be chosen at random.

In some cases, an adjustment to a RSSI candidate selection threshold may be used to select candidate resources for reporting and/or reselection. For instance, an RSSI candidate selection threshold may be gradually increased by 3 dB until 25% of the total number of candidate resources 625-b are available resources that are less than the RSSI candidate selection threshold. After the last such 3 dB increase that satisfies the RSSI candidate selection threshold, more than 25% of candidate resources 625-b may be available resources below the RSSI candidate selection threshold. Such available resources may be considered low RSSI resources 640 if they were below the RSSI candidate selection threshold before the last 3 dB increase and may be considered medium RSSI resources 645 if they are below the RSSI candidate selection threshold after the last 3 dB increase. Available resources that are still above the RSSI candidate selection threshold may be considered high RSSI resources 650. The low RSSI resources 640 may automatically be chosen for reselection and/or reporting and a subset of the remaining medium RSSI resources 645 may be chosen such that 25% of candidate resources 625-b are chosen for reselection.

For instance, in the present example, there are 16 available resources, of which 4 (e.g., as 16*0.25=4) may be chosen. In a previous 3 dB increase, only low RSSI resources 640 may have been above a RSSI candidate selection threshold. However, there are only 2 low RSSI resources 640, which is below the 4 to be chosen. In a next 3 dB increase, medium RSSI resources 645 may be below the new RSSI candidate selection threshold. The 8 available resources (e.g., 2 low RSSI resources 640 and 6 medium RSSI resources 645) exceed the 4 to be chosen, meaning that the 4 resources to be reported and/or reselected from may be chosen from the 8 available resources. The 2 low RSSI resources 640 may be chosen automatically and the remaining 2 resources for reporting and/or reselection may be chosen randomly from the 6 same RSSI resources 645. It should be noted that although a 3 dB increase is used in the present example, that the dB value may be different without deviating from the scope of the present disclosure.

Figure 7:
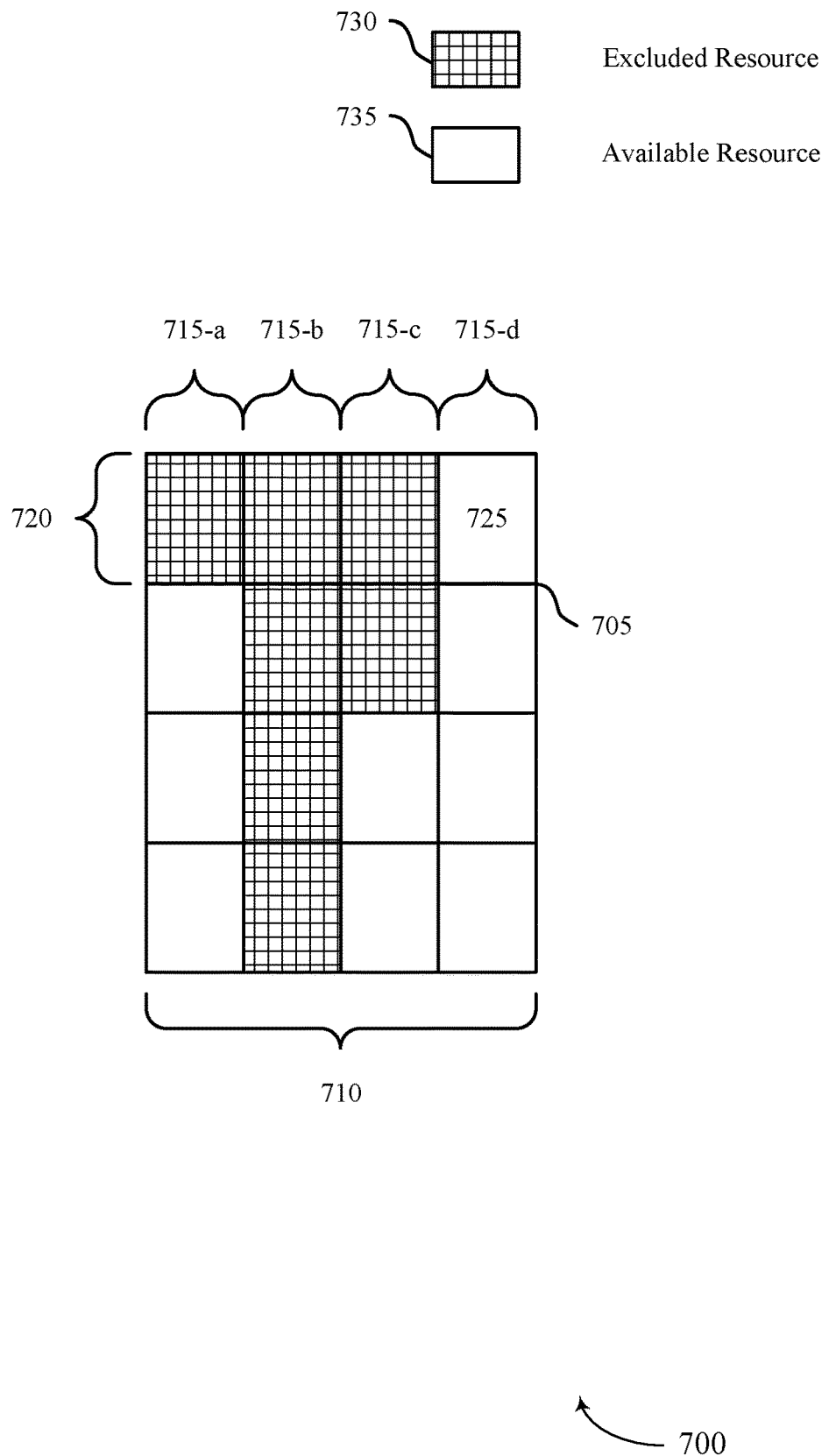
FIG. 7 illustrates an example of a reselection mechanism in accordance with aspects of the present disclosure.

FIG. 7 illustrates a reselection mechanism 700 in accordance with one or more aspects of the present disclosure. In some examples, reselection mechanism 700 may be implemented by aspects of wireless communications systems 100 and 200 and reselection mechanism 500. For instance, reselection mechanism 700 may be implemented by a UE 115 as described with reference to FIGS. 1, 2, and/or 5. Reselection mechanism 700 may include resource candidates pattern 705, which may be an example resource candidates pattern 515 with respect to FIG. 5; an SPS period 710, which may be an example of an SPS period 520 with respect to FIG. 5, subframes 715 (e.g., subframes 715-a, 715-b, 715-c, and 715-d), which may be an example of subframes 525 with respect to FIG. 5; subchannels 720, which may be an example of subchannels 530 with respect to FIG. 5; candidate resources 725, which may be an example of candidate resources 540 with respect to FIG. 5; excluded resources 730, which may be an example of excluded resources 555 with respect to FIG. 5; and available resources 735, which may be an example of available resources 560 with respect to FIG. 5.

During a reselection process, a number of candidate resources 725 (e.g., seven in the present example) may be excluded resources 730. They may be excluded, for example, based on the methods disclosed within FIG. 5 or may be excluded through other methods (e.g., individual candidate resources 725 may be excluded). Of the available resources 735, only a certain percentage may be chosen for reporting and/or reselecting. For example, only 20% of the available resources 735 may be chosen for reporting and/or reselecting, among which a random selection may be chosen.

In some cases, a UE 115 may assign equal probabilities to each available resource 735 and may choose the certain percentage randomly based on equal probabilities. For example, the UE 115 may be 1.5 times more likely to choose an available resource 735 within subframe 715-a for reporting and/or reselecting over an available resource 735 within subframe 715-c for reporting and/or reselecting. Choosing available resources 735 this way may mitigate bias probability of candidate resources 725 by dividing the overall probability by the average number of times that a subchannel shows up in a candidate list. Additionally or alternatively, the UE 115 may assign equal probabilities per available selection resource. For instance, subframe 715-a may include 2 candidate blocks and subframe 715-c may include 1 candidate block. As such, the probability of choose subframe 715-a may be two to one. However, subframe 715-a may include 3 available candidate resources 725 and subframe 715-c may include 2 available candidate resources 725. As such, assigning equal probabilities per available selection resource may lower the bias towards choosing subframe 715-a for reporting and/or reselection.

Figure 8:
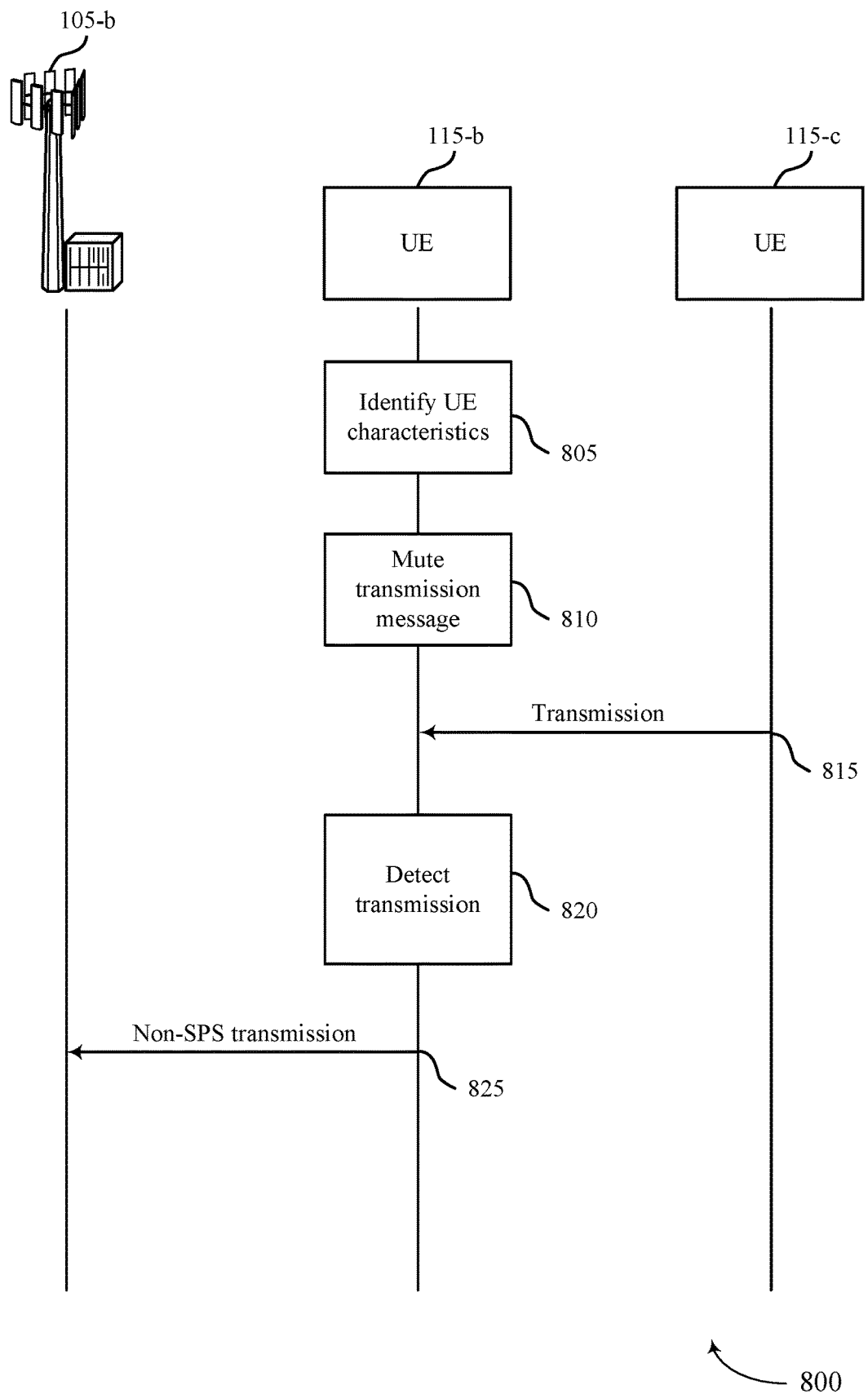
FIG. 8 illustrates an example of a process flow in accordance with aspects of the present disclosure.

FIG. 8 illustrates a process flow 800 in accordance with aspects of the present disclosure. In some examples, process flow 800 may implement aspects of wireless communications systems 100 and 200 and collision detection mechanisms 300 and 400. Process flow 800 may include a base station 105-b, UE 115-b, and UE 115-c, which may be examples of a base station 105 and UEs 115 as described with reference to FIGS. 1 and 2. It should be noted that base station 105-b may be replaced with a UE 115, a cluster of UEs 115, a cluster of base stations 105, an infrastructure entity, a vehicle, a pedestrian entity, a grid entity, or any other wireless device without deviating from the scope of the present disclosure.

At 805, UE 115-b may identify that it is configured to transmit via one or more periodic SPS resources on a shared channel accessed in a half-duplex manner. The shared channel may be, for instance, within a V2X network.

At 810, UE 115-b may mute transmission of a message during at least one of the SPS resources in order to monitor for transmissions from another device during the at least muted SPS resource. In some cases, UE 115-b may mute transmission of a message based on a triggering event. For instance, muting transmission of the message may be triggered by determining that a speed of UE 115-b is above a threshold and/or determining that a congestion level (e.g., a CBR) associated with UE 115-b is above a threshold. Additionally or alternatively, muting transmission of a message may be triggered based on determining that SPS transmissions from another device (e.g., UE 115-c) are no longer being received. In some cases, triggering may be binary (e.g., passing the threshold may trigger muting directly) or triggering may include increasing or decreasing a percentage associated with how often muting is performed upon passing the threshold. In some cases (e.g., when HARQ is enabled), the message that is being muted may be a retransmission of a message transmitted earlier (e.g., a message transmitted within the same SPS period on another SPS resource). Further, muting throughout the SPS resources may be configured to alternate between muting a retransmission of a message and muting the transmission of the message.

At 815, UE 115-b may receive a transmission from another device (e.g., a UE 115-c).

At 820, UE 115-b may detect the transmission from the other device during the at least one SPS resource. In some cases, UE 115-*b* may reselect SPS resources for subsequent or future SPS periods based on detecting the transmission.

At 825, UE 115-*b* may transmit the message on another resource (e.g., a non-SPS resource). Transmitting the message on the other resource may be based on adjusting transmission of the message of a different resource in order to avoid overlapping transmissions from the other device, which may in turn be prompted by detecting the transmission from the other device during the at least one SPS resource. In some cases, however, transmitting the message on the other resource may occur each time muting occurs. In some cases, adjusting the transmission may be based on a RSSI associated with the other device (e.g., UE 115-*c*) being above a certain threshold.

Figure 9:
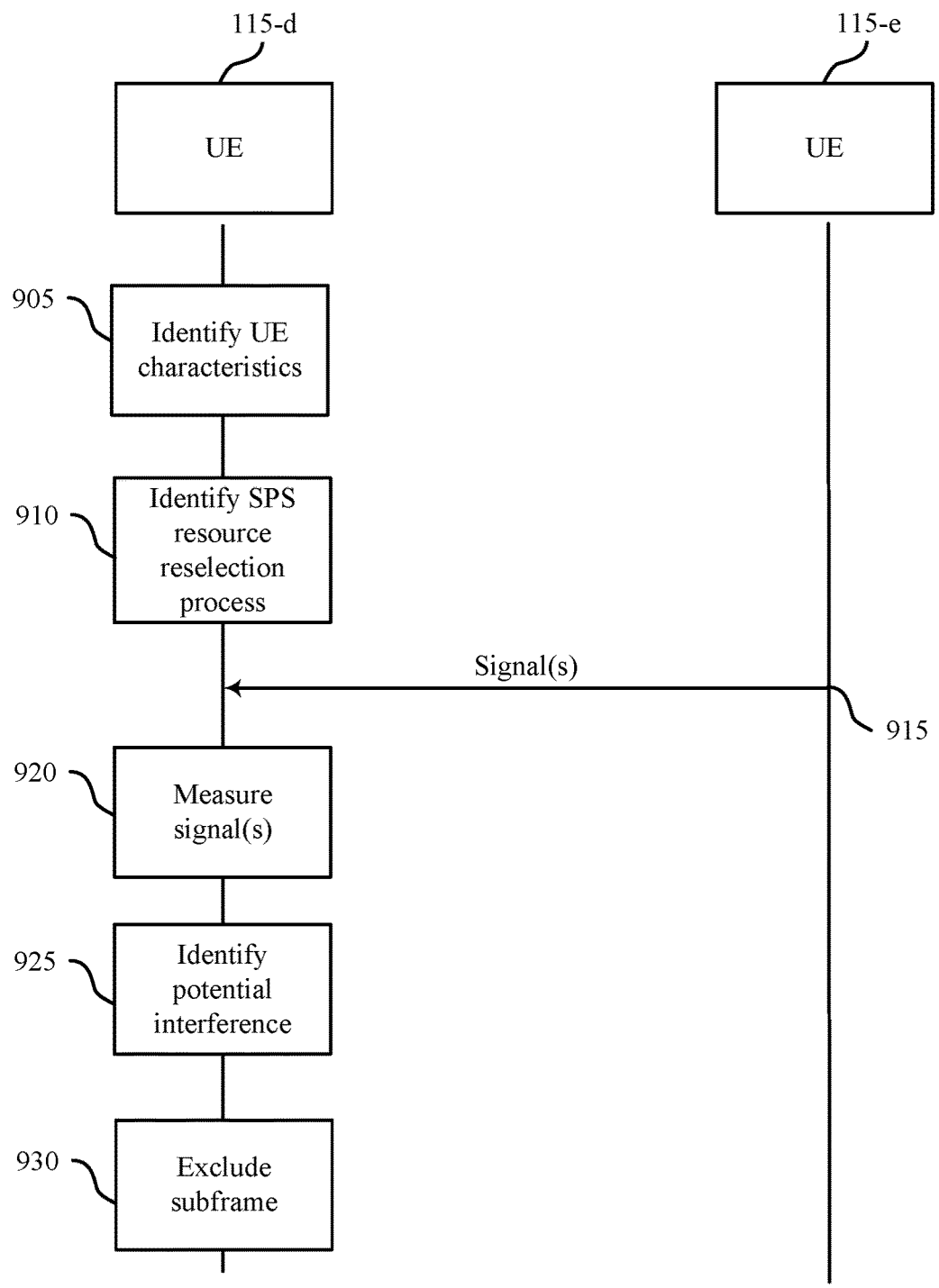
FIG. 9 illustrates an example of a process flow in accordance with aspects of the present disclosure.

FIG. 9 illustrates a process flow 900 in accordance with aspects of the present disclosure. In some examples, process flow 900 may implement aspects of wireless communications systems 100 and 200 and reselection mechanisms 500, 600, 601, and 700. Process flow 900 may include a UE 115-*d* and UE 115-*e*, which may be examples of UEs 115 as described with reference to FIGS. 1 and 2. It should be noted that UE 115-*e* may be replaced with a UE 115, a cluster of UEs 115, a cluster of base stations 105, an infrastructure entity, a vehicle, a pedestrian entity, a grid entity, or any other wireless device without deviating from the scope of the present disclosure.

At 905, UE 115-*d* may identify that it is configured for SPS transmissions via a configuration of one or more SPS resources in a shared channel where UE 115-*d* accesses the channel in a half-duplex manner. The shared channel may, for instance, be part of a V2X network.

At 910, UE 115-*d* may identify that UE 115-*d* is to participate in an SPS resource selection process to update the configuration of periodic SPS resources.

At 915, UE 115-*d* may receive one or more signals (e.g., from UE 115-*e*) to be used for measuring.

At 920, UE 115-*d* may measure the one or more signals indicative of potential interference during one or more subframes that include the periodic SPS resources.

At 925, UE 115-*d* may identify potential interference on a portion of frequency resources in a subframe of the one or more subframes. In some cases, identifying potential interference may involve identifying a first threshold interference value associated with a portion of a subframe (e.g., a subchannel) and identifying a second threshold interference value associated with the entire subframe. In such cases, UE 115-*d* may, for instance, determine that the potential interference on the portion of frequency resources in the subframe is above the second threshold value. In other cases, identifying potential interference may involve ranking the one or more subframe based on a total received power within each subframe (e.g., the power of each subchannel of a subframe summed up). In some cases, UE 115-*d* may determine that the subframe to be excluded forms part of a threshold percentage number of the one or more subframes having the highest total received powers.

At 930, UE 115-*d* may exclude an entirety of the subframe from the SPS resource reselection process based on the potential interference being identified on the portion of frequency resources in the subframe. In some cases, excluding the entirety of the subframe may be based on UE 115-*d* determining that the potential interference on the portion of frequency resources in the subframe is above the second threshold value. In other cases, excluding the entirety of the subframe may be based on determining that the subframe forms part of the threshold percentage number of the one or more subframes having the highest total received powers.

Figure 10:
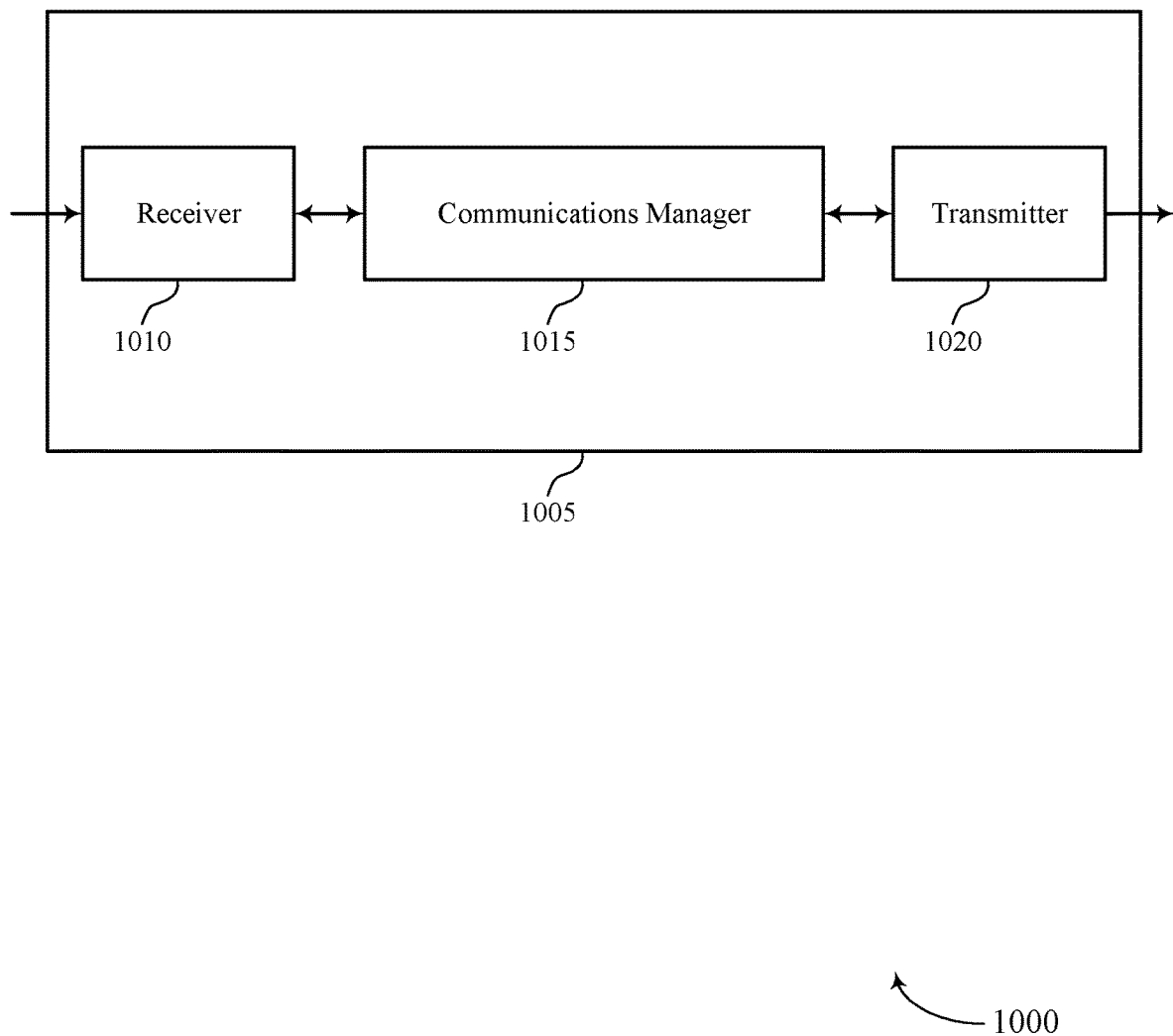
FIGS. 10 and 11 show block diagrams of devices in accordance with aspects of the present disclosure.

FIG. 10 shows a block diagram 1000 of a device 1005 in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to collision avoidance of half-duplex resource selection, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify that the UE is configured to transmit via a set of periodic SPS resources on a shared channel accessed in a half-duplex manner, mute transmission of a message during at least one of the SPS resources in order to monitor for transmissions from another device during the at least one SPS resource, detect a transmission from another device on the shared channel during the at least one SPS resource, and adjust, based on detection of the transmission from the other device during the at least one SPS resource, transmission of the message to a different resource in order to avoid overlapping transmissions from the other device. The communications manager 1015 may also identify that the UE is configured for SPS transmissions via a configuration of periodic SPS resources on a shared channel accessed in a half-duplex manner, identify that the UE is to participate in an SPS resource reselection process to update the configuration of periodic SPS resources, measure signals indicative of potential interference during one or more subframes that include the periodic SPS resources, identify, based on the measuring, potential interference on a portion of frequency resources in a subframe of the one or more subframes, and exclude an entirety of the subframe from the SPS resource reselection process based on the potential interference being identified on the portion of frequency resources in the subframe. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver. For example, the transmitter 1020 may be an example of aspects of the transceiver 1320 described with reference to FIG. 13. The transmitter 1020 may utilize a single antenna or a set of antennas.

Figure 11:
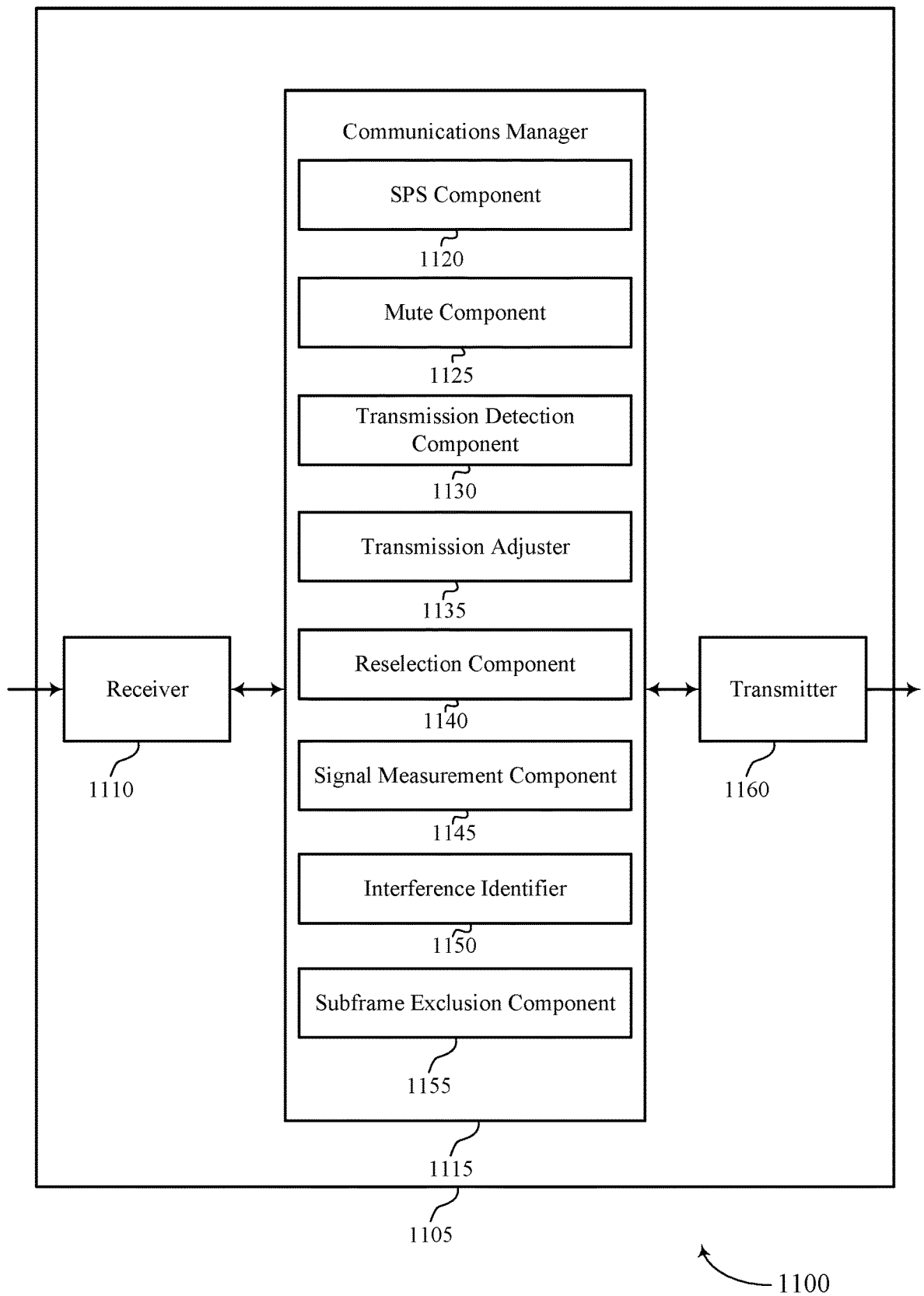

FIG. 11 shows a block diagram 1100 of a device 1105 in accordance with aspects of the present disclosure. The device 1105 may be an example of aspects of a device 1005, or a UE 115 as described herein. The device 1105 may include a receiver 1110, a communications manager 1115, and a transmitter 1160. The device 1105 may also include a processor. Each of these components may be in communication with one another (e.g., via one or more buses).

The receiver 1110 may receive information such as packets, user data, or control information associated with various information channels (e.g., control channels, data channels, and information related to collision avoidance of half-duplex resource selection, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a SPS component 1120, a mute component 1125, a transmission detection component 1130, a transmission adjuster 1135, a reselection component 1140, a signal measurement component 1145, an interference identifier 1150, and a subframe exclusion component 1155. The communications manager 1115 may be an example of aspects of the communications manager 1310 described herein.

The SPS component 1120 may identify that the UE is configured to transmit via a set of periodic SPS resources on a shared channel accessed in a half-duplex manner. The SPS component 1120 may, additionally or alternatively, identify that the UE is configured for SPS transmissions via a configuration of periodic SPS resources on a shared channel accessed in a half-duplex manner.

The mute component 1125 may mute transmission of a message during at least one of the SPS resources in order to monitor for transmissions from another device during the at least one SPS resource.

The transmission detection component 1130 may detect a transmission from another device on the shared channel during the at least one SPS resource.

The transmission adjuster 1135 may adjust, based on detection of the transmission from the other device during the at least one SPS resource, transmission of the message to a different resource in order to avoid overlapping transmissions from the other device.

The reselection component 1140 may identify that the UE is to participate in an SPS resource reselection process to update the configuration of periodic SPS resources.

The signal measurement component 1145 may measure signals indicative of potential interference during one or more subframes that include the periodic SPS resources.

The interference identifier 1150 may identify, based on the measuring, potential interference on a portion of frequency resources in a subframe of the one or more subframes.

The subframe exclusion component 1155 may exclude an entirety of the subframe from the SPS resource reselection process based on the potential interference being identified on the portion of frequency resources in the subframe.

The transmitter 1160 may transmit signals generated by other components of the device 1105. In some examples, the transmitter 1160 may be collocated with a receiver 1110 in a transceiver. For example, the transmitter 1160 may be an example of aspects of the transceiver 1320 described with reference to FIG. 13. The transmitter 1160 may utilize a single antenna or a set of antennas.

Figure 12:
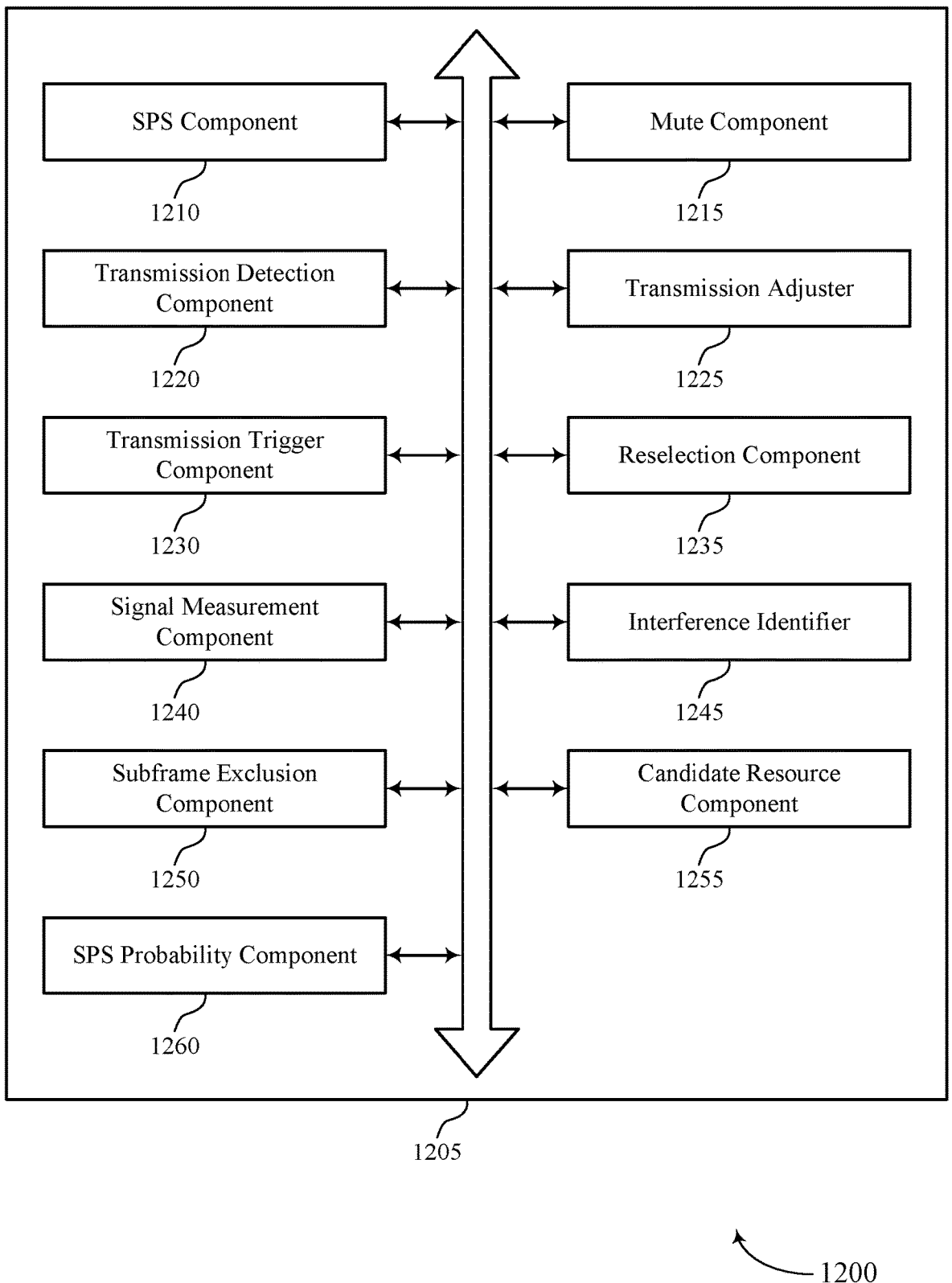
FIG. 12 shows a block diagram of a communications manager in accordance with aspects of the present disclosure.

FIG. 12 shows a block diagram 1200 of a communications manager 1205 in accordance with aspects of the present disclosure. The communications manager 1205 may be an example of aspects of a communications manager 1015, a communications manager 1115, or a communications manager 1310 described herein. The communications manager 1205 may include a SPS component 1210, a mute component 1215, a transmission detection component 1220, a transmission adjuster 1225, a transmission trigger component 1230, a reselection component 1235, a signal measurement component 1240, an interference identifier 1245, a subframe exclusion component 1250, a candidate resource component 1255, and a SPS probability component 1260. Each of these components may communicate, directly or indirectly, with one another (e.g., via one or more buses).

The SPS component 1210 may identify that the UE is configured to transmit via a set of periodic SPS resources on a shared channel accessed in a half-duplex manner. In some examples, the SPS component 1210 may identify that the UE is configured for SPS transmissions via a configuration of periodic SPS resources on a shared channel accessed in a half-duplex manner. In some cases, the shared channel is within a vehicle-to-everything (V2X) network.

The mute component 1215 may mute transmission of a message during at least one of the SPS resources in order to monitor for transmissions from another device during the at least one SPS resource. In some examples, the mute component 1215 may identify a threshold percentage of the set of periodic SPS resources, where muting transmission of the message is based on a percentage of SPS resources on which transmissions are muted within a period being less than the threshold percentage. In some examples, the mute component 1215 may identify that the UE is configured to transmit HARQ-based retransmissions of the message, where muting transmission of the message is based on whether the transmission of the message is a first transmission or a retransmission, and on whether a previous muting of a transmission on the set of periodic SPS resources was for a first transmission or a retransmission. In some examples, the mute component 1215 may detect a retransmission from an additional device on the shared channel outside of the set of periodic SPS resources, without detecting an initial transmission from the additional device, where transmission of the message is adjusted to a different resource in order to avoid overlapping with the initial transmission from the additional device.

The transmission detection component 1220 may detect a transmission from another device on the shared channel during the at least one SPS resource.

The transmission adjuster 1225 may adjust, based on detection of the transmission from the other device during the at least one SPS resource, transmission of the message to a different resource in order to avoid overlapping transmissions from the other device. In some examples, the transmission adjuster 1225 may determine a RSSI associated with the transmission from the other device is above a threshold, where adjusting transmission of the message to the different resource is further based on the RSSI being above the threshold. In some examples, the transmission adjuster 1225 may exclude the entirety of the subframe from the SPS resource reselection process is based on the potential interference being above the second threshold interference value. In some cases, the different resource includes a resource outside of the periodic set of SPS resources.

The transmission trigger component 1230 may identify a triggering event, where transmission of the message is muted based on the identification of the triggering event. In some examples, the transmission trigger component 1230 may determine a speed associated with the UE. In some examples, the transmission trigger component 1230 may determine that the speed satisfies a speed threshold. In some examples, the transmission trigger component 1230 may determine a congestion level associated with the UE. In some examples, the transmission trigger component 1230 may determine that the congestion level satisfies a congestion level threshold. In some examples, the transmission trigger component 1230 may receive one or more transmissions from the other device on a second set of periodic SPS resources. In some examples, the transmission trigger component 1230 may determine, after the one or more transmissions from the other device associated with the second set of periodic SPS resources have been received, that the UE is not detecting additional transmissions from the other device on the second set of periodic SPS resources.

The reselection component 1235 may identify that the UE is to participate in an SPS resource reselection process to update the configuration of periodic SPS resources. In some examples, the reselection component 1235 may perform the SPS resource reselection process, where a subframe selection probability for each candidate subframe is biased based on an average number of times that a subchannel of each candidate subframe is included in a candidate block.

The signal measurement component 1240 may measure signals indicative of potential interference during one or more subframes that include the periodic SPS resources.

The interference identifier 1245 may identify, based on the measuring, potential interference on a portion of frequency resources in a subframe of the one or more subframes. In some examples, the interference identifier 1245 may identify a first threshold interference value associated with exclusion of only a portion of the subframe. In some examples, the interference identifier 1245 may identify a second threshold interference value associated with exclusion of the entirety of the subframe, the second threshold interference value being greater than the first threshold interference value. In some examples, the interference identifier 1245 may determine that the potential interference on the portion of the frequency resources in the subframe is above the second threshold interference value, where. In some examples, the interference identifier 1245 may rank the one or more subframes based on a total received power received within each subframe. In some examples, the interference identifier 1245 may determine that the subframe forms part of a threshold percentage number of the one or more subframes having highest total received powers, where the entirety of the subframe is excluded from the SPS resource reselection process based on the subframe forming part of the threshold percentage number. In some examples, the interference identifier 1245 may identify that an averaged RSSI for subchannels of the subframe is above a threshold RSSI amount. In some examples, the interference identifier 1245 may determine that a level of congestion of all subchannels and subframes of a total amount of periodic SPS resources is above a threshold. In some examples, the interference identifier 1245 may determine that a level of congestion of all subchannels and subframes of a total amount of periodic SPS resources is below a threshold.

The subframe exclusion component 1250 may exclude an entirety of the subframe from the SPS resource reselection process based on the potential interference being identified on the portion of frequency resources in the subframe. In some examples, the subframe exclusion component 1250 may exclude the entirety of the subframe from the SPS resource reselection process is further based on the amount of remaining candidate resources being greater than the threshold percentage. In some examples, the subframe exclusion component 1250 may exclude the entirety of the subframe from the SPS resource reselection process is further based on whether the configuration of periodic SPS resources is for an initial transmission or for HARQ-based retransmission. In some cases, the entirety of the subframe is excluded from the SPS resource reselection process regardless of whether the configuration of periodic SPS resources is for an initial transmission or for HARQ-based retransmission.

The candidate resource component 1255 may identify an amount of remaining candidate resources from the one or more subframes that would remain after exclusion of the entirety of the subframe.

In some examples, the candidate resource component 1255 may determine that the amount of remaining candidate resources is greater than a threshold percentage of a total amount of periodic SPS resources, where. In some examples, the candidate resource component 1255 may identify a set of SPS candidate resources from the one or more subframes. In some examples, the candidate resource component 1255 may determine a RSSI associated with each candidate resource of the set of SPS candidate resources. In some examples, the candidate resource component 1255 may randomize at least a portion of the SPS resource reselection process based on the RSSI associated with each candidate resource of the set of SPS candidate resources. In some examples, the candidate resource component 1255 may determine that all candidate resources of the set of SPS candidate resources have RSSI values that are within a threshold deviation of each other, where the SPS resource reselection process is fully randomized based on all of the SPS candidate resources of the set of SPS candidate resources have RSSI values within the threshold deviation. In some examples, the candidate resource component 1255 may determine that only a portion of candidate resources of the set of SPS candidate resources have RSSI values that are within a threshold deviation of each other, where the SPS resource reselection process is only partially randomized based on less than all of the SPS candidate resources of the set of SPS candidate resources having RSSI values within the threshold deviation.

The SPS probability component 1260 may decrease a probability associated with refraining from performing the SPS resource reselection process based on the level of congestion is above the threshold. In some examples, the SPS probability component 1260 may increase a probability associated with refraining from performing the SPS resource reselection process based on the level of congestion is below the threshold. In some examples, the SPS probability component 1260 may determine a geographical or temporal context associated with the UE. In some examples, the SPS probability component 1260 may adjust a probability associated with performing the SPS resource reselection process based on the geographical or temporal context.

Figure 13:
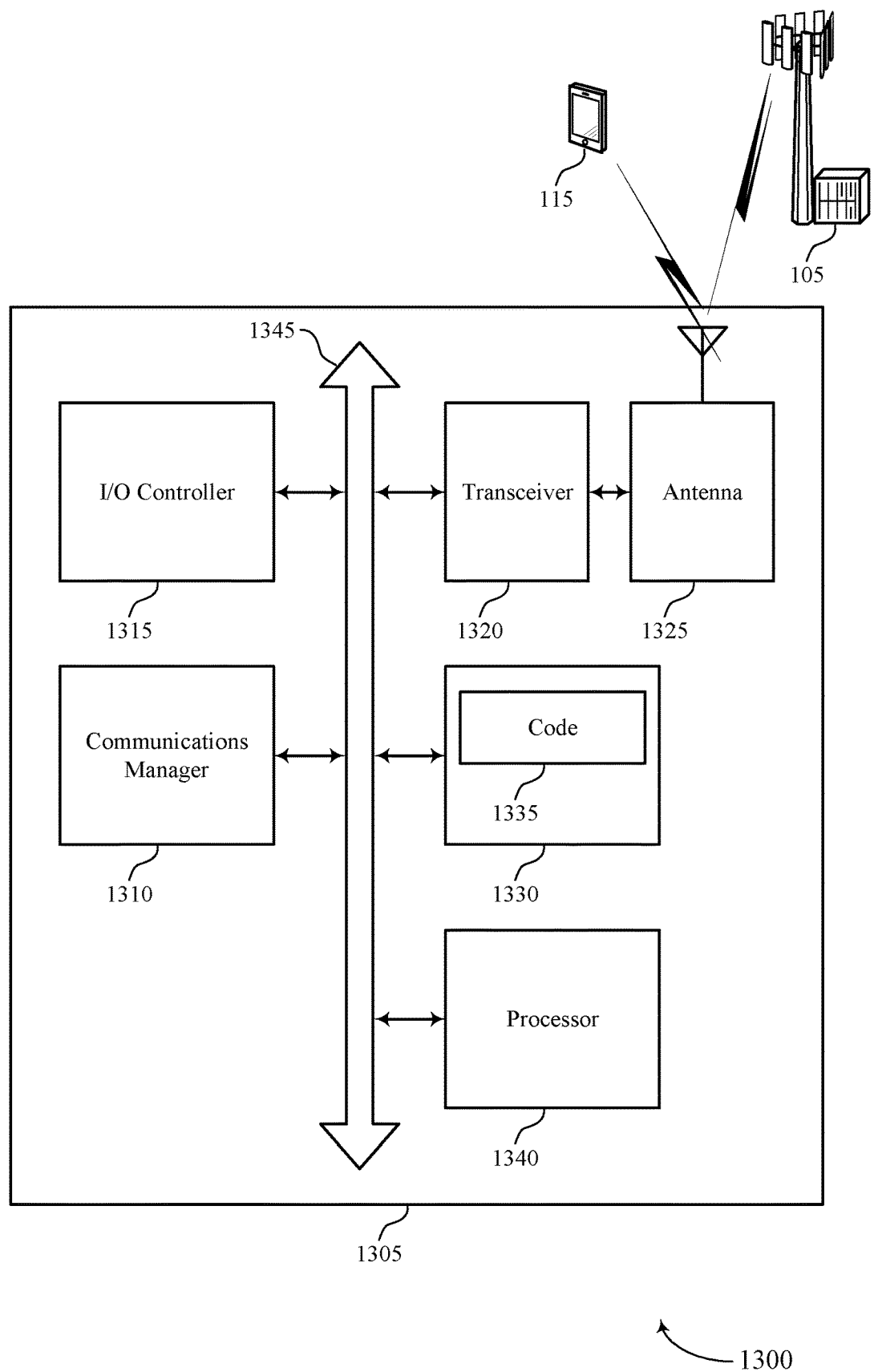
FIG. 13 shows a diagram of a system including a device in accordance with aspects of the present disclosure.

FIG. 13 shows a diagram of a system 1300 including a device 1305 in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify that the UE is configured to transmit via a set of periodic SPS resources on a shared channel accessed in a half-duplex manner, mute transmission of a message during at least one of the SPS resources in order to monitor for transmissions from another device during the at least one SPS resource, detect a transmission from another device on the shared channel during the at least one SPS resource, and adjust, based on detection of the transmission from the other device during the at least one SPS resource, transmission of the message to a different resource in order to avoid overlapping transmissions from the other device. The communications manager 1310 may also identify that the UE is configured for SPS transmissions via a configuration of periodic SPS resources on a shared channel accessed in a half-duplex manner, identify that the UE is to participate in an SPS resource reselection process to update the configuration of periodic SPS resources, measure signals indicative of potential interference during one or more subframes that include the periodic SPS resources, identify, based on the measuring, potential interference on a portion of frequency resources in a subframe of the one or more subframes, and exclude an entirety of the subframe from the SPS resource reselection process based on the potential interference being identified on the portion of frequency resources in the subframe.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting collision avoidance of half-duplex resource selection).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
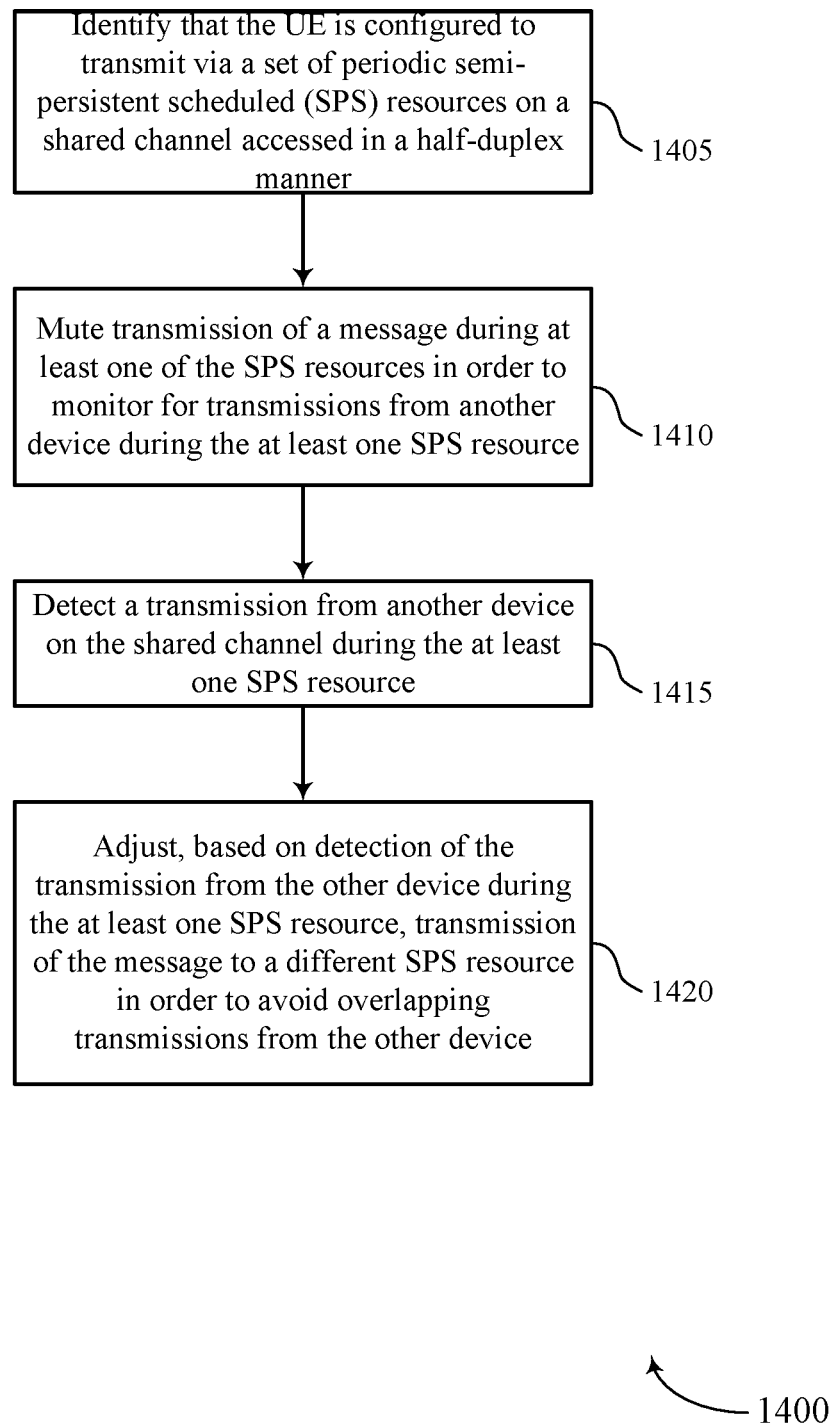
FIGS. 14 through 19 show flowcharts illustrating methods in accordance with aspects of the present disclosure.

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1405, the UE may identify that the UE is configured to transmit via a set of periodic SPS resources on a shared channel accessed in a half-duplex manner. The operations of 1405 may be performed according to the methods described herein. In some examples, aspects of the operations of 1405 may be performed by a SPS component as described with reference to FIGS. 10 through 13.

At 1410, the UE may mute transmission of a message during at least one of the SPS resources in order to monitor for transmissions from another device during the at least one SPS resource. The operations of 1410 may be performed according to the methods described herein. In some examples, aspects of the operations of 1410 may be performed by a mute component as described with reference to FIGS. 10 through 13.

At 1415, the UE may detect a transmission from another device on the shared channel during the at least one SPS resource. The operations of 1415 may be performed according to the methods described herein. In some examples, aspects of the operations of 1415 may be performed by a transmission detection component as described with reference to FIGS. 10 through 13.

At 1420, the UE may adjust, based on detection of the transmission from the other device during the at least one SPS resource, transmission of the message to a different resource in order to avoid overlapping transmissions from the other device. The operations of 1420 may be performed according to the methods described herein. In some examples, aspects of the operations of 1420 may be performed by a transmission adjuster as described with reference to FIGS. 10 through 13.

Figure 15:
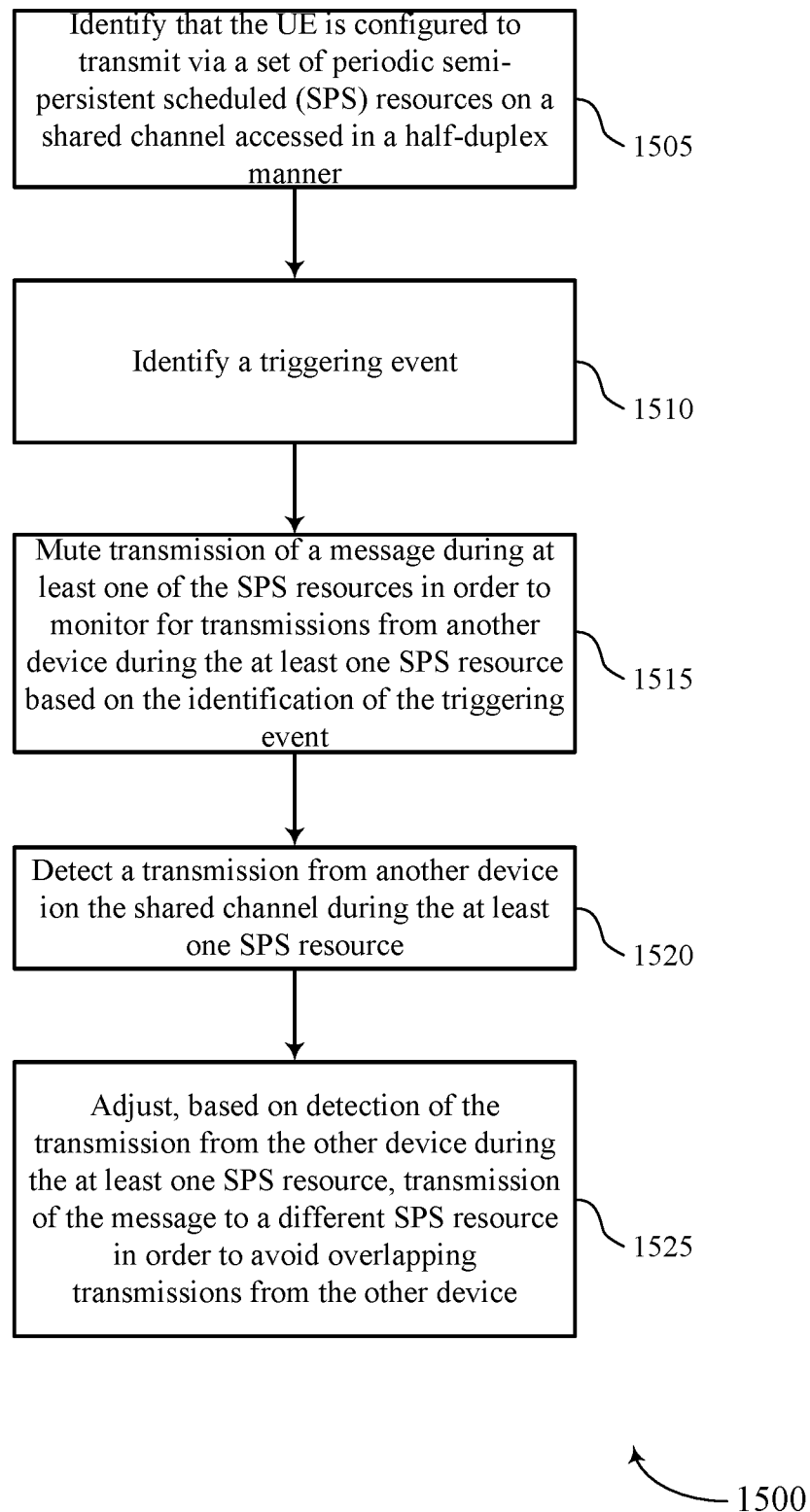

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1505, the UE may identify that the UE is configured to transmit via a set of periodic SPS resources on a shared channel accessed in a half-duplex manner. The operations of 1505 may be performed according to the methods described herein. In some examples, aspects of the operations of 1505 may be performed by a SPS component as described with reference to FIGS. 10 through 13.

At 1510, the UE may identify a triggering event. The operations of 1510 may be performed according to the methods described herein. In some examples, aspects of the operations of 1510 may be performed by a transmission trigger component as described with reference to FIGS. 10 through 13.

At 1515, the UE may mute transmission of a message during at least one of the SPS resources in order to monitor for transmissions from another device during the at least one SPS resource based on the identification of the triggering event. The operations of 1515 may be performed according to the methods described herein. In some examples, aspects of the operations of 1515 may be performed by a mute component as described with reference to FIGS. 10 through 13.

At 1520, the UE may detect a transmission from another device on the shared channel during the at least one SPS resource. The operations of 1520 may be performed according to the methods described herein. In some examples, aspects of the operations of 1520 may be performed by a transmission detection component as described with reference to FIGS. 10 through 13.

At 1525, the UE may adjust, based on detection of the transmission from the other device during the at least one SPS resource, transmission of the message to a different resource in order to avoid overlapping transmissions from the other device. The operations of 1525 may be performed according to the methods described herein. In some examples, aspects of the operations of 1525 may be performed by a transmission adjuster as described with reference to FIGS. 10 through 13.

Figure 16:
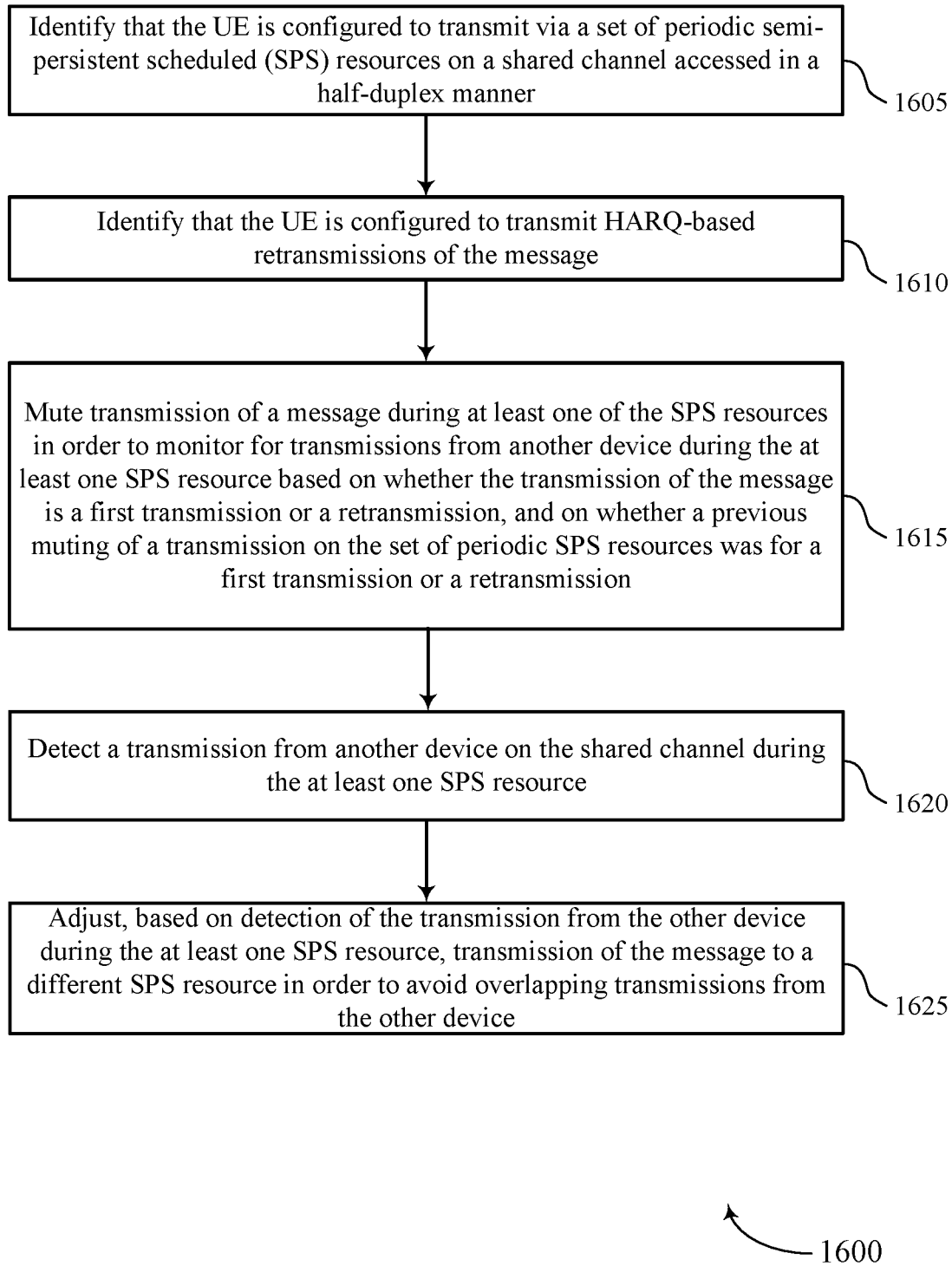

FIG. 16 shows a flowchart illustrating a method 1600 in accordance with aspects of the present disclosure. The operations of method 1600 may be implemented by a UE 115 or its components as described herein. For example, the operations of method 1600 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1605, the UE may identify that the UE is configured to transmit via a set of periodic SPS resources on a shared channel accessed in a half-duplex manner. The operations of 1605 may be performed according to the methods described herein. In some examples, aspects of the operations of 1605 may be performed by a SPS component as described with reference to FIGS. 10 through 13.

At 1610, the UE may identify that the UE is configured to transmit HARQ-based retransmissions of the message. The operations of 1610 may be performed according to the methods described herein. In some examples, aspects of the operations of 1610 may be performed by a mute component as described with reference to FIGS. 10 through 13.

At 1615, the UE may mute transmission of a message during at least one of the SPS resources in order to monitor for transmissions from another device during the at least one SPS resource based on whether the transmission of the message is a first transmission or a retransmission, and on whether a previous muting of a transmission on the set of periodic SPS resources was for a first transmission or a retransmission. The operations of 1615 may be performed according to the methods described herein. In some examples, aspects of the operations of 1615 may be performed by a mute component as described with reference to FIGS. 10 through 13.

At 1620, the UE may detect a transmission from another device on the shared channel during the at least one SPS resource. The operations of 1620 may be performed according to the methods described herein. In some examples, aspects of the operations of 1620 may be performed by a transmission detection component as described with reference to FIGS. 10 through 13.

At 1625, the UE may adjust, based on detection of the transmission from the other device during the at least one SPS resource, transmission of the message to a different resource in order to avoid overlapping transmissions from the other device. The operations of 1625 may be performed according to the methods described herein. In some examples, aspects of the operations of 1625 may be performed by a transmission adjuster as described with reference to FIGS. 10 through 13.

Figure 17:
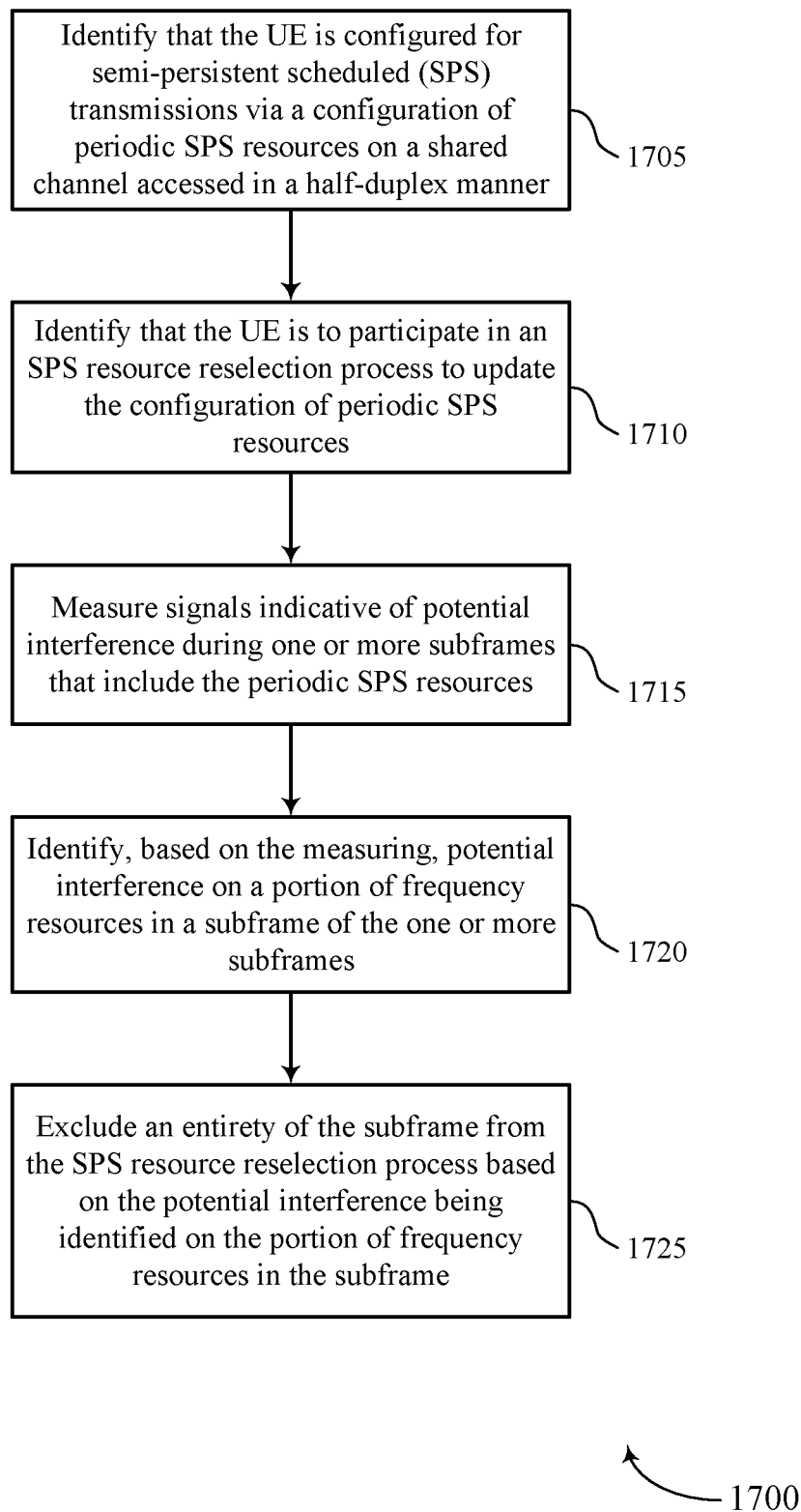

FIG. 17 shows a flowchart illustrating a method 1700 in accordance with aspects of the present disclosure. The operations of method 1700 may be implemented by a UE 115 or its components as described herein. For example, the operations of method 1700 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1705, the UE may identify that the UE is configured for SPS transmissions via a configuration of periodic SPS resources on a shared channel accessed in a half-duplex manner. The operations of 1705 may be performed according to the methods described herein. In some examples, aspects of the operations of 1705 may be performed by a SPS component as described with reference to FIGS. 10 through 13.

At 1710, the UE may identify that the UE is to participate in an SPS resource reselection process to update the configuration of periodic SPS resources. The operations of 1710 may be performed according to the methods described herein. In some examples, aspects of the operations of 1710 may be performed by a reselection component as described with reference to FIGS. 10 through 13.

At 1715, the UE may measure signals indicative of potential interference during one or more subframes that include the periodic SPS resources. The operations of 1715 may be performed according to the methods described herein. In some examples, aspects of the operations of 1715 may be performed by a signal measurement component as described with reference to FIGS. 10 through 13.

At 1720, the UE may identify, based on the measuring, potential interference on a portion of frequency resources in a subframe of the one or more subframes. The operations of 1720 may be performed according to the methods described herein. In some examples, aspects of the operations of 1720 may be performed by an interference identifier as described with reference to FIGS. 10 through 13.

At 1725, the UE may exclude an entirety of the subframe from the SPS resource reselection process based on the potential interference being identified on the portion of frequency resources in the subframe. The operations of 1725 may be performed according to the methods described herein. In some examples, aspects of the operations of 1725 may be performed by a subframe exclusion component as described with reference to FIGS. 10 through 13.

Figure 18:
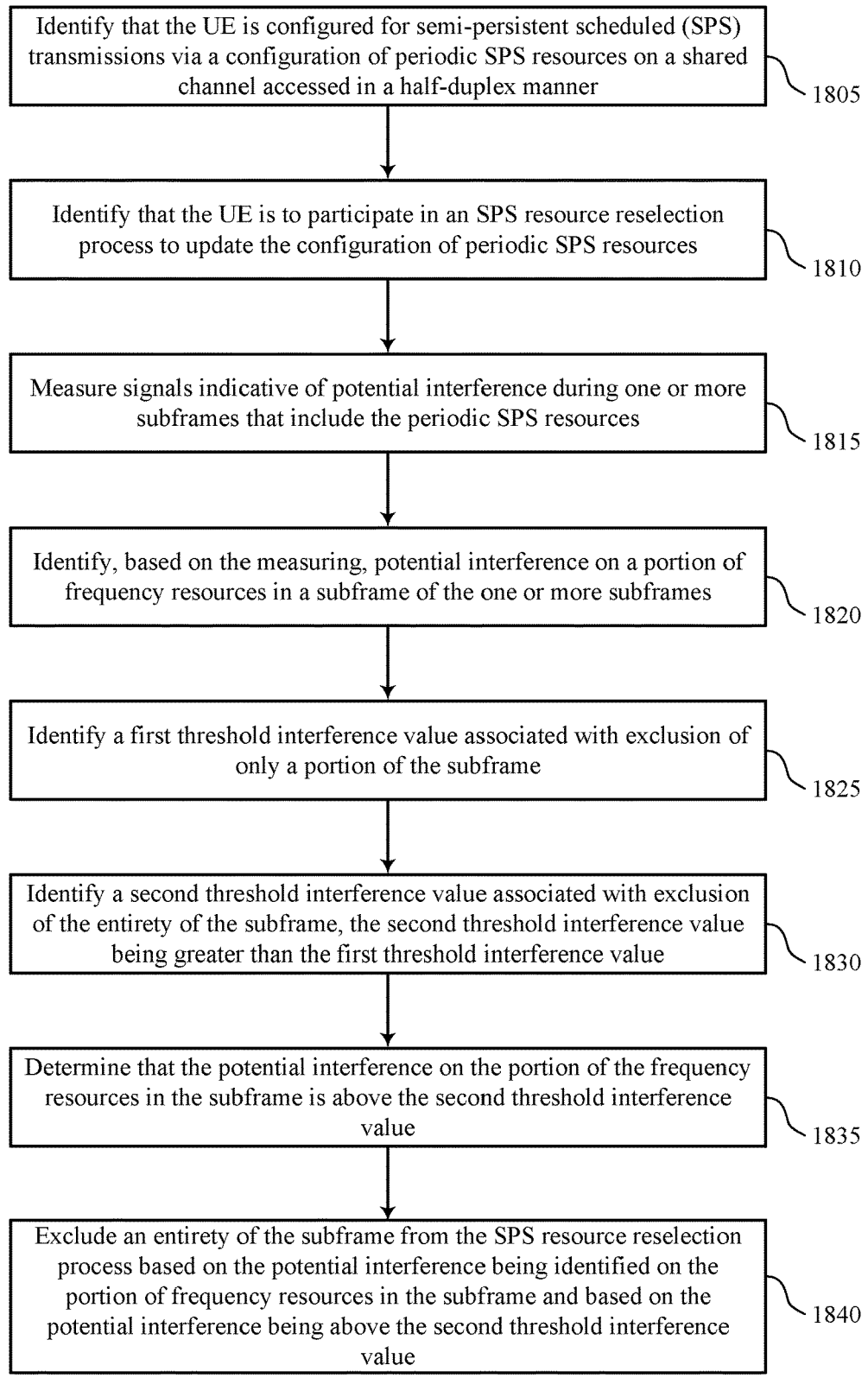

FIG. 18 shows a flowchart illustrating a method 1800 in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may identify that the UE is configured for SPS transmissions via a configuration of periodic SPS resources on a shared channel accessed in a half-duplex manner. The operations of 1805 may be performed according to the methods described herein. In some examples, aspects of the operations of 1805 may be performed by a SPS component as described with reference to FIGS. 10 through 13.

At 1810, the UE may identify that the UE is to participate in an SPS resource reselection process to update the configuration of periodic SPS resources. The operations of 1810 may be performed according to the methods described herein. In some examples, aspects of the operations of 1810 may be performed by a reselection component as described with reference to FIGS. 10 through 13.

At 1815, the UE may measure signals indicative of potential interference during one or more subframes that include the periodic SPS resources. The operations of 1815 may be performed according to the methods described herein. In some examples, aspects of the operations of 1815 may be performed by a signal measurement component as described with reference to FIGS. 10 through 13.

At 1820, the UE may identify, based on the measuring, potential interference on a portion of frequency resources in a subframe of the one or more subframes. The operations of 1820 may be performed according to the methods described herein. In some examples, aspects of the operations of 1820 may be performed by an interference identifier as described with reference to FIGS. 10 through 13.

At 1825, the UE may identify a first threshold interference value associated with exclusion of only a portion of the subframe. The operations of 1825 may be performed according to the methods described herein. In some examples, aspects of the operations of 1825 may be performed by an interference identifier as described with reference to FIGS. 10 through 13.

At 1830, the UE may identify a second threshold interference value associated with exclusion of the entirety of the subframe, the second threshold interference value being greater than the first threshold interference value. The operations of 1830 may be performed according to the methods described herein. In some examples, aspects of the operations of 1830 may be performed by an interference identifier as described with reference to FIGS. 10 through 13.

At 1835, the UE may determine that the potential interference on the portion of the frequency resources in the subframe is above the second threshold interference value. The operations of 1835 may be performed according to the methods described herein. In some examples, aspects of the operations of 1835 may be performed by an interference identifier as described with reference to FIGS. 10 through 13.

At 1840, the UE may exclude an entirety of the subframe from the SPS resource reselection process based on the potential interference being identified on the portion of frequency resources in the subframe and based on the potential interference being above the second threshold interference value. The operations of 1840 may be performed according to the methods described herein. In some examples, aspects of the operations of 1840 may be performed by a subframe exclusion component as described with reference to FIGS. 10 through 13.

At 1845, the UE may exclude the entirety of the subframe from the SPS resource reselection process is based on the potential interference being above the second threshold interference value. The operations of 1845 may be performed according to the methods described herein. In some examples, aspects of the operations of 1845 may be performed by a transmission adjuster as described with reference to FIGS. 10 through 13.

Figure 19:
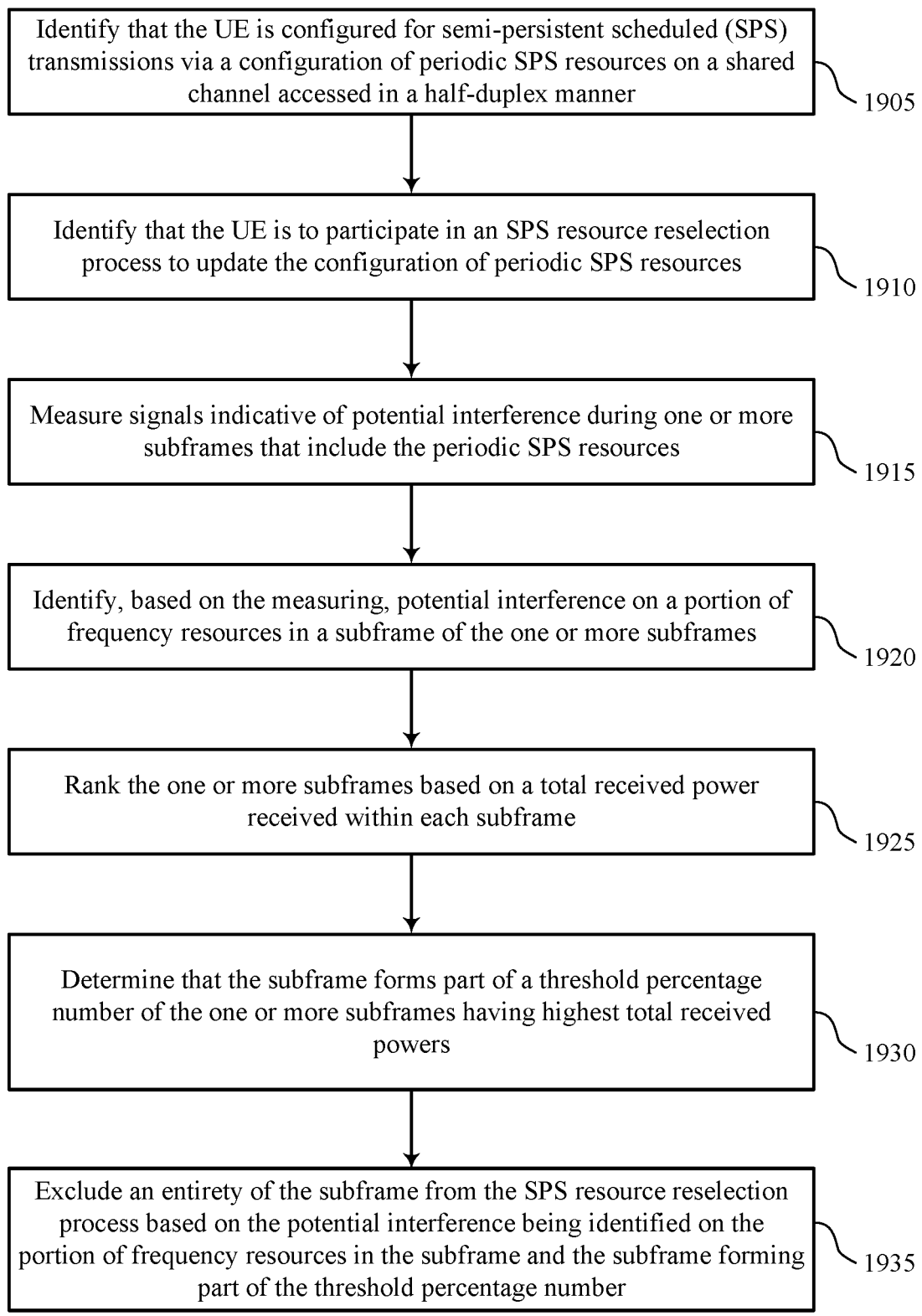

FIG. 19 shows a flowchart illustrating a method 1900 in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may identify that the UE is configured for SPS transmissions via a configuration of periodic SPS resources on a shared channel accessed in a half-duplex manner. The operations of 1905 may be performed according to the methods described herein. In some examples, aspects of the operations of 1905 may be performed by a SPS component as described with reference to FIGS. 10 through 13.

At 1910, the UE may identify that the UE is to participate in an SPS resource reselection process to update the configuration of periodic SPS resources. The operations of 1910 may be performed according to the methods described herein. In some examples, aspects of the operations of 1910 may be performed by a reselection component as described with reference to FIGS. 10 through 13.

At 1915, the UE may measure signals indicative of potential interference during one or more subframes that include the periodic SPS resources. The operations of 1915 may be performed according to the methods described herein. In some examples, aspects of the operations of 1915 may be performed by a signal measurement component as described with reference to FIGS. 10 through 13.

At 1920, the UE may identify, based on the measuring, potential interference on a portion of frequency resources in a subframe of the one or more subframes. The operations of 1920 may be performed according to the methods described herein. In some examples, aspects of the operations of 1920 may be performed by an interference identifier as described with reference to FIGS. 10 through 13.

At 1925, the UE may rank the one or more subframes based on a total received power received within each subframe. The operations of 1925 may be performed according to the methods described herein. In some examples, aspects of the operations of 1925 may be performed by an interference identifier as described with reference to FIGS. 10 through 13.

At 1930, the UE may determine that the subframe forms part of a threshold percentage number of the one or more subframes having highest total received powers. The operations of 1930 may be performed according to the methods described herein. In some examples, aspects of the operations of 1930 may be performed by an interference identifier as described with reference to FIGS. 10 through 13.

At 1935, the UE may exclude an entirety of the subframe from the SPS resource reselection process based on the potential interference being identified on the portion of frequency resources in the subframe and the subframe forming part of the threshold percentage number. The operations of 1935 may be performed according to the methods described herein. In some examples, aspects of the operations of 1935 may be performed by a subframe exclusion component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1

A method for wireless communication at a user equipment (UE), comprising: identifying that the UE is configured to transmit via a plurality of periodic semi-persistently scheduled (SPS) resources on a shared channel accessed in a half-duplex manner; muting transmission of a message during at least one of the SPS resources in order to monitor for transmissions from another device during the at least one SPS resource; detecting a transmission from the other device on the shared channel during the at least one SPS resource; and adjusting, based at least in part on detection of the transmission from the other device during the at least one SPS resource, transmission of the message to a different resource in order to avoid overlapping transmissions from the other device.

Example 2

The method of example 1, wherein muting the transmission of the message comprises: identifying a triggering event, wherein the transmission of the message is muted based at least in part on the identification of the triggering event.

Example 3

The method of any of examples 1 or 2, wherein identifying the triggering event comprises: determining a speed associated with the UE and determining that the speed satisfies a speed threshold.

Example 4

The method of any of examples 1 to 3, wherein identifying the triggering event comprises: determining a congestion level associated with the UE; and determining that the congestion level satisfies a congestion level threshold.

Example 5

The method of any of examples 1 to 4, wherein identifying the triggering event comprises: receiving one or more transmissions from the other device on a second plurality of periodic SPS resources; and determining, after the one or more transmissions from the other device associated with the second plurality of periodic SPS resources have been received, that the UE is not detecting additional transmissions from the other device on the second plurality of periodic SPS resources.

Example 6

The method of any of examples 1 to 5, further comprising: identifying that the UE is configured to transmit hybrid automatic repeat request (HARQ)-based retransmissions of the message, wherein muting the transmission of the message is based at least in part on whether the transmission of the message is a first transmission or a retransmission, and on whether a previous muting of a transmission on the plurality of periodic SPS resources was for a first transmission or a retransmission.

Example 7

The method of any of examples 1 to 6, wherein muting the transmission of the message is based on a percentage of SPS resources on which transmissions are muted within a period being less than the threshold percentage.

Example 8

The method of any of examples 1 to 7, further comprising: detecting a retransmission from an additional device on the shared channel outside of the plurality of periodic SPS resources, without detecting an initial transmission from the additional device, wherein the transmission of the message is adjusted to the different resource in order to avoid overlapping with the initial transmission from the additional device.

Example 9

The method of any of examples 1 to 8, further comprising: determining a received signal strength indicator (RSSI) associated with the transmission from the other device is above a threshold, wherein adjusting the transmission of the message to the different resource is further based at least in part on the RSSI being above the threshold.

Example 10

The method of any of examples 1 to 9, wherein the different resource comprises a resource outside of the plurality of periodic SPS resources.

Example 11

The method of any of examples 1 to 10, wherein the shared channel is within a vehicle-to-everything (V2X) network.

Example 12

An apparatus comprising at least one means for performing a method of any of examples 1 to 11.

Example 13

An apparatus for wireless communications comprising a processor; memory in electronic communication with the processor; and instructions stored in the memory and executable by the processor to cause the apparatus to perform a method of any of examples 1 to 11.

Example 14

A non-transitory computer-readable medium storing code for wireless communications, the code comprising instructions executable by a processor to perform a method of any of examples 1 to 11.

Example 15

A method of wireless communication at a user equipment (UE), the method comprising: identifying that the UE is configured for semi-persistently scheduled (SPS) transmissions via a configuration of periodic SPS resources on a shared channel accessed in a half-duplex manner; identifying that the UE is to participate in an SPS resource reselection process to update the configuration of periodic SPS resources; measuring signals indicative of potential interference during one or more subframes that include the periodic SPS resources; identifying, based at least in part on the measuring, potential interference on a portion of frequency resources in a subframe of the one or more subframes; and excluding an entirety of the subframe from the SPS resource reselection process based at least in part on the potential interference being identified on the portion of frequency resources in the subframe.

Example 16

The method of example 15, further comprising: identifying a first threshold interference value associated with exclusion of only a portion of the subframe; identifying a second threshold interference value associated with exclusion of the entirety of the subframe, the second threshold interference value being greater than the first threshold interference value; and determining that the potential interference on the portion of the frequency resources in the subframe is above the second threshold interference value, wherein excluding the entirety of the subframe from the SPS resource reselection process is based at least in part on the potential interference being above the second threshold interference value.

Example 17

The method of any of examples 15 to 16, further comprising: ranking the one or more subframes based at least in part on a total received power received within each subframe; and determining that the subframe is within a threshold percentage of the one or more subframes having a highest total received power, wherein the entirety of the subframe is excluded from the SPS resource reselection process based at least in part on the subframe being within the threshold percentage.

Example 18

The method of any of examples 15 to 17, further comprising: identifying an amount of remaining candidate resources from the one or more subframes that would remain after exclusion of the entirety of the subframe; and determining that the amount of remaining candidate resources is greater than a threshold percentage of a total amount of periodic SPS resources, wherein excluding the entirety of the subframe from the SPS resource reselection process is further based on the amount of remaining candidate resources being greater than the threshold percentage.

Example 19

The method of any of examples 15 to 18, wherein identifying potential interference on the portion of frequency resources in the subframe of the one or more subframes comprises: identifying that an averaged received signal strength indicator (RSSI) for subchannels of the subframe is above a threshold RSSI amount.

Example 20

The method of any of examples 15 to 19, wherein: excluding the entirety of the subframe from the SPS resource reselection process is further based on whether the configuration of periodic SPS resources is for an initial transmission or for hybrid automatic repeat request (HARQ)-based retransmission.

Example 21

The method of any of examples 15 to 20, wherein the entirety of the subframe is excluded from the SPS resource reselection process regardless of whether the configuration of periodic SPS resources is for an initial transmission or for hybrid automatic repeat request (HARQ)-based retransmission.

Example 22

The method of any of examples 15 to 21, further comprising: determining that a level of congestion of all subchannels and subframes of a total amount of periodic SPS resources is above a threshold; and decreasing a probability associated with refraining from performing the SPS resource reselection process based at least in part on the level of congestion is above the threshold.

Example 23

The method of any of examples 15 to 22, further comprising: determining that a level of congestion of all subchannels and subframes of a total amount of periodic SPS resources is below a threshold; and decreasing a probability associated with refraining from performing the SPS resource reselection process based at least in part on the level of congestion is below the threshold.

Example 24

The method of any of examples 15 to 23, further comprising: identifying a plurality of SPS candidate resources from the one or more subframes; determining a received signal strength indicator (RSSI) associated with each candidate resource of the plurality of SPS candidate resources; and randomizing at least a portion of the SPS resource reselection process based at least in part on the RSSI associated with the each candidate resource of the plurality of SPS candidate resources.

Example 25

The method of any of examples 15 to 24, further comprising: determining that all candidate resources of the plurality of SPS candidate resources have RSSI values that are within a threshold deviation of each other, wherein the SPS resource reselection process is fully randomized based at least in part on all of the SPS candidate resources of the plurality of SPS candidate resources having RSSI values within the threshold deviation.

Example 26

The method of any of examples 15 to 25, further comprising: determining that only a portion of candidate resources of the plurality of SPS candidate resources have RSSI values that are within a threshold deviation of each other, wherein the SPS resource reselection process is only partially randomized based at least in part on less than all of the SPS candidate resources of the plurality of SPS candidate resources having RSSI values within the threshold deviation.

Example 27

The method of any of examples 15 to 26, further comprising: determining a geographical or temporal context associated with the UE; and adjusting a probability associated with performing the SPS resource reselection process based at least in part on the geographical or temporal context.

Example 28

The method of any of examples 15 to 27, further comprising: performing the SPS resource reselection process, wherein a subframe selection probability for each candidate subframe is biased based on an average number of times that a subchannel of the each candidate subframe is included in a candidate block.

Example 29

The method of any of examples 15 to 28, wherein the shared channel is within a vehicle-to-everything (V2X) network.

Example 30

An apparatus comprising at least one means for performing a method of any of examples 15 to 29.

Example 31

An apparatus for wireless communications comprising a processor; memory in electronic communication with the processor; and instructions stored in the memory and executable by the processor to cause the apparatus to perform a method of any of examples 15 to 29.

Example 32

A non-transitory computer-readable medium storing code for wireless communications, the code comprising instructions executable by a processor to perform a method of any of examples 15 to 29.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE is configured to transmit via a plurality of periodic semi-persistently scheduled (SPS) resources on a shared channel accessed in a half-duplex manner;

muting transmission of a scheduled message during at least one of the SPS resources in order to monitor for transmissions from another device during the at least one SPS resource based at least in part on a probability parameter whose value is based on occurrence of a triggering event, wherein the muting comprises skipping transmission of the scheduled message during the at least one SPS resource;

detecting a transmission from the other device on the shared channel during the at least one SPS resource; and adjusting, based at least in part on detection of the transmission from the other device during the at least one SPS resource, transmission of the scheduled message to a different resource in order to avoid overlapping transmissions from the other device.

2. The method of claim 1, further comprising:
determining a speed associated with the UE; and
determining that the speed satisfies a speed threshold, wherein determination that the speed satisfies the speed threshold is the triggering event.

3. The method of claim 1, further comprising:
determining a congestion level associated with the UE; and
determining that the congestion level satisfies a congestion level threshold, wherein determination that the congestion level satisfies the congestion level threshold is the triggering event.

4. The method of claim 1, further comprising:
receiving one or more transmissions from the other device on a second plurality of periodic SPS resources; and
determining, after the one or more transmissions from the other device associated with the second plurality of periodic SPS resources have been received, that the UE is not detecting additional transmissions from the other device on the second plurality of periodic SPS resources, wherein the UE not detecting additional transmissions from the other device on the second plurality of periodic SPS resources is the triggering event.

5. The method of claim 1, further comprising:
identifying that the UE is configured to transmit hybrid automatic repeat request (HARQ)-based retransmissions of the scheduled message, wherein muting the transmission of the scheduled message is based at least in part on whether the transmission of the scheduled message is a first transmission or a retransmission, and on whether a previous muting of a transmission on the plurality of periodic SPS resources was for a first transmission or a retransmission.

6. The method of claim 1, wherein muting the transmission of the scheduled message is based on a percentage of SPS resources on which transmissions are muted within a period being less than a threshold percentage.

7. The method of claim 6, further comprising:
detecting a retransmission from an additional device on the shared channel outside of the plurality of periodic SPS resources, without detecting an initial transmission from the additional device, wherein the transmission of the scheduled message is adjusted to the different resource in order to avoid overlapping with the initial transmission from the additional device.

8. The method of claim 1, further comprising:
determining a received signal strength indicator (RSSI) associated with the transmission from the other device is above a threshold, wherein adjusting the transmission of the scheduled message to the different resource is further based at least in part on the RSSI being above the threshold.

9. The method of claim 1, wherein the different resource comprises a resource outside of the plurality of periodic SPS resources.

10. The method of claim 1, wherein the shared channel is within a vehicle-to-everything (V2X) network.

11. A method of wireless communication at a user equipment (UE), the method comprising:
identifying that the UE is configured for semi-persistently scheduled (SPS) transmissions via a configuration of periodic SPS resources on a shared channel accessed in a half-duplex manner;

detecting a collision, an energy level above a first threshold, a total received power above a second threshold, or any combination thereof on an SPS resource of the periodic SPS resources;

adjusting a probability associated with refraining from performing an SPS resource reselection process based at least in part on whether a level of congestion of all subchannels and subframes of a total quantity of periodic SPS resources satisfies a third threshold;

triggering, based at least in part on the detecting and the probability, the UE to participate in the SPS resource reselection process to update the configuration of periodic SPS resources;

measuring signals indicative of potential interference during one or more subframes that include the periodic SPS resources;

identifying, based at least in part on the measuring, potential interference on a portion of frequency resources in a subframe of the one or more subframes; and excluding an entirety of the subframe from the SPS resource reselection process based at least in part on the potential interference being identified on the portion of frequency resources in the subframe.

12. The method of claim 11, further comprising:
identifying a first threshold interference value associated with exclusion of only a portion of the subframe;
identifying a second threshold interference value associated with exclusion of the entirety of the subframe, the second threshold interference value being greater than the first threshold interference value; and
determining that the potential interference on the portion of the frequency resources in the subframe is above the second threshold interference value, wherein excluding the entirety of the subframe from the SPS resource reselection process is based at least in part on the potential interference being above the second threshold interference value.

13. The method of claim 11, further comprising:
ranking the one or more subframes based at least in part on a second total received power received within each subframe; and
determining that the subframe forms part of a threshold percentage number of the one or more subframes having highest second total received powers, wherein the entirety of the subframe is excluded from the SPS resource reselection process based at least in part on the subframe forming part of the threshold percentage number.

14. The method of claim 11, further comprising:
identifying an amount of remaining candidate resources from the one or more subframes that would remain after exclusion of the entirety of the subframe; and determining that the amount of remaining candidate resources is greater than a threshold percentage of a total amount of periodic SPS resources, wherein excluding the entirety of the subframe from the SPS resource reselection process is further based on the amount of remaining candidate resources being greater than the threshold percentage.

15. The method of claim 11, wherein identifying potential interference on the portion of frequency resources in the subframe of the one or more subframes comprises:
identifying that an averaged received signal strength indicator (RSSI) for subchannels of the subframe is above a threshold RSSI amount.

16. The method of claim 11, wherein:
excluding the entirety of the subframe from the SPS resource reselection process is further based on whether the configuration of periodic SPS resources is for an initial transmission or for hybrid automatic repeat request (HARQ)-based retransmission.

17. The method of claim 11, wherein the entirety of the subframe is excluded from the SPS resource reselection process regardless of whether the configuration of periodic SPS resources is for an initial transmission or for hybrid automatic repeat request (HARQ)-based retransmission.

18. The method of claim 11, further comprising:
determining that the level of congestion of all subchannels and subframes of the total quantity of periodic SPS resources is above the third threshold; and
decreasing the probability associated with refraining from performing the SPS resource reselection process based at least in part on the level of congestion being above the third threshold.

19. The method of claim 11, further comprising:
determining that the level of congestion of all subchannels and subframes of the total quantity of periodic SPS resources is below the third threshold; and
increasing the probability associated with refraining from performing the SPS resource reselection process based at least in part on the level of congestion being below the third threshold.

20. The method of claim 11, further comprising:
identifying a plurality of SPS candidate resources from the one or more subframes;
determining a received signal strength indicator (RSSI) associated with each candidate resource of the plurality of SPS candidate resources; and
randomizing at least a portion of the SPS resource reselection process based at least in part on the RSSI associated with the each candidate resource of the plurality of SPS candidate resources.

21. The method of claim 20, further comprising:
determining that all candidate resources of the plurality of SPS candidate resources have RSSI values that are within a threshold deviation of each other, wherein the SPS resource reselection process is fully randomized based at least in part on all of the SPS candidate resources of the plurality of SPS candidate resources having RSSI values within the threshold deviation.

22. The method of claim 20, further comprising:
determining that only a portion of candidate resources of the plurality of SPS candidate resources have RSSI values that are within a threshold deviation of each other, wherein the SPS resource reselection process is only partially randomized based at least in part on less than all of the SPS candidate resources of the plurality of SPS candidate resources having RSSI values within the threshold deviation.

23. The method of claim 11, further comprising:
determining a geographical or temporal context associated with the UE; and
adjusting a probability associated with performing the SPS resource reselection process based at least in part on the geographical or temporal context.

24. The method of claim 11, further comprising:
performing the SPS resource reselection process, wherein a subframe selection probability for each candidate subframe is biased based on an average number of times that a subchannel of the each candidate subframe is included in a candidate block.

25. The method of claim 11, wherein the shared channel is within a vehicle-to-everything (V2X) network.

26. An apparatus for wireless communication at a user equipment (UE), comprising: a processor, memory in electronic communication with the processor; and instructions stored in the memory and executable by the processor to cause the apparatus to:
identify that the UE is configured to transmit via a plurality of periodic semi-persistently scheduled (SPS) resources on a shared channel accessed in a half-duplex manner;
mute transmission of a scheduled message during at least one of the SPS resources in order to monitor for transmissions from another device during the at least one SPS resource based at least in part on a probability parameter whose value is based on occurrence of a triggering event, wherein the muting comprises skipping transmission of the scheduled message during the at least one SPS resource;
detect a transmission from the other device on the shared channel during the at least one SPS resource; and
adjust, based at least in part on detection of the transmission from the other device during the at least one SPS resource, transmission of the scheduled message to a different resource in order to avoid overlapping transmissions from the other device.

27. The apparatus of claim 26, wherein the instructions are further executable by the processor to cause the apparatus to:
determine a speed associated with the UE; and
determine that the speed satisfies a speed threshold, wherein determination that the speed satisfies the speed threshold is the triggering event.

28. The apparatus of claim 26, wherein the instructions are further executable by the processor to cause the apparatus to:
determine a congestion level associated with the UE; and
determine that the congestion level satisfies a congestion level threshold, wherein determination that the congestion level satisfies the congestion level threshold is the triggering event.

29. The apparatus of claim 26, wherein the instructions are further executable by the processor to cause the apparatus to:
receive one or more transmissions from the other device on a second plurality of periodic SPS resources; and
determine, after the one or more transmissions from the other device associated with the second plurality of periodic SPS resources have been received, that the UE is not detecting additional transmissions from the other device on the second plurality of periodic SPS resources, wherein the UE not detecting additional transmissions from the other device on the second plurality of periodic SPS resources is the triggering event.

30. The apparatus of claim 26, wherein the instructions are further executable by the processor to cause the apparatus to:
identify that the UE is configured to transmit hybrid automatic repeat request (HARQ)-based retransmissions of the scheduled message, wherein muting the transmission of the scheduled message is based at least in part on whether the transmission of the scheduled message is a first transmission or a retransmission, and on whether a previous muting of a transmission on the plurality of periodic SPS resources was for a first transmission or a retransmission.

31. The apparatus of claim 26, wherein muting the transmission of the scheduled message is based on a percentage of SPS resources on which transmissions are muted within a period being less than a threshold percentage.

32. The apparatus of claim 31, wherein the instructions are further executable by the processor to cause the apparatus to:
detect a retransmission from an additional device on the shared channel outside of the plurality of periodic SPS resources, without detecting an initial transmission from the additional device, wherein the transmission of the scheduled message is adjusted to the different resource in order to avoid overlapping with the initial transmission from the additional device.

33. The apparatus of claim 26, wherein the instructions are further executable by the processor to cause the apparatus to:
determine a received signal strength indicator (RSSI) associated with the transmission from the other device is above a threshold, wherein adjusting the transmission of the scheduled message to the different resource is further based at least in part on the RSSI being above the threshold.

34. The apparatus of claim 26, wherein the different resource comprises a resource outside of the plurality of periodic SPS resources.

35. The apparatus of claim 26, wherein the shared channel is within a vehicle-to-everything (V2X) network.

36. An apparatus wireless communication at a user equipment (UE), comprising:
a processor,
memory in electronic communication with the processor; and
instructions stored in the memory and executable by the processor to cause the apparatus to:
identify that the UE is configured for semi-persistently scheduled (SPS) transmissions via a configuration of periodic SPS resources on a shared channel accessed in a half-duplex manner;
detect a collision, an energy level above a first threshold, a total received power above a second threshold, or any combination thereof on an SPS resource of the periodic SPS resources;
adjust a probability associated with refraining from performing an SPS resource reselection process based at least in part on whether a level of congestion of all subchannels and subframes of a total quantity of periodic SPS resources satisfies a third threshold;
trigger, based at least in part on the detecting and the probability, the UE to participate in the SPS resource reselection process to update the configuration of periodic SPS resources;
measure signals indicative of potential interference during one or more subframes that include the periodic SPS resources;
identify, based at least in part on the measuring, potential interference on a portion of frequency resources in a subframe of the one or more subframes; and
exclude an entirety of the subframe from the SPS resource reselection process based at least in part on the potential interference being identified on the portion of frequency resources in the subframe.

37. The apparatus of claim 36, wherein the instructions are further executable by the processor to cause the apparatus to:
identify a first threshold interference value associated with exclusion of only a portion of the subframe;
identify a second threshold interference value associated with exclusion of the entirety of the subframe, the second threshold interference value being greater than the first threshold interference value; and
determine that the potential interference on the portion of the frequency resources in the subframe is above the second threshold interference value, wherein excluding the entirety of the subframe from the SPS resource reselection process is based at least in part on the potential interference being above the second threshold interference value.

38. The apparatus of claim 36, wherein the instructions are further executable by the processor to cause the apparatus to:
rank the one or more subframes based at least in part on a second total received power received within each subframe; and
determine that the subframe forms part of a threshold percentage number of the one or more subframes having highest second total received powers, wherein the entirety of the subframe is excluded from the SPS resource reselection process based at least in part on the subframe forming part of the threshold percentage number.

39. The apparatus of claim 36, wherein the instructions are further executable by the processor to cause the apparatus to:
identify an amount of remaining candidate resources from the one or more subframes that would remain after exclusion of the entirety of the subframe; and
determine that the amount of remaining candidate resources is greater than a threshold percentage of a total amount of periodic SPS resources, wherein excluding the entirety of the subframe from the SPS resource reselection process is further based on the amount of remaining candidate resources being greater than the threshold percentage.

40. The apparatus of claim 36, wherein the instructions to identify potential interference on the portion of frequency resources in the subframe of the one or more subframes are executable by the processor to cause the apparatus to:
identify that an averaged received signal strength indicator (RSSI) for subchannels of the subframe is above a threshold RSSI amount.

41. The apparatus of claim 36, wherein excluding the entirety of the subframe from the SPS resource reselection process is further based on whether the configuration of periodic SPS resources is for an initial transmission or for hybrid automatic repeat request (HARQ)-based retransmission.

42. The apparatus of claim 36, wherein the entirety of the subframe is excluded from the SPS resource reselection process regardless of whether the configuration of periodic SPS resources is for an initial transmission or for hybrid automatic repeat request (HARQ)-based retransmission.

43. The apparatus of claim 36, wherein the instructions are further executable by the processor to cause the apparatus to:
  determine that the level of congestion of all subchannels and subframes of the total quantity of periodic SPS resources is above the third threshold; and
  decrease the probability associated with refraining from performing the SPS resource reselection process based at least in part on the level of congestion being above the third threshold.

44. The apparatus of claim 36, wherein the instructions are further executable by the processor to cause the apparatus to:
  determine that the level of congestion of all subchannels and subframes of the total quantity of periodic SPS resources is below the third threshold; and
  increase the probability associated with refraining from performing the SPS resource reselection process based at least in part on the level of congestion being below the third threshold.

45. The apparatus of claim 36, wherein the instructions are further executable by the processor to cause the apparatus to:
  identify a plurality of SPS candidate resources from the one or more subframes;
  determine a received signal strength indicator (RSSI) associated with each candidate resource of the plurality of SPS candidate resources; and
  randomize at least a portion of the SPS resource reselection process based at least in part on the RSSI associated with the each candidate resource of the plurality of SPS candidate resources.

46. The apparatus of claim 45, wherein the instructions are further executable by the processor to cause the apparatus to:
  determine that all candidate resources of the plurality of SPS candidate resources have RSSI values that are within a threshold deviation of each other, wherein the SPS resource reselection process is fully randomized based at least in part on all of the SPS candidate resources of the plurality of SPS candidate resources having RSSI values within the threshold deviation.

47. The apparatus of claim 45, wherein the instructions are further executable by the processor to cause the apparatus to:
  determine that only a portion of candidate resources of the plurality of SPS candidate resources have RSSI values that are within a threshold deviation of each other, wherein the SPS resource reselection process is only partially randomized based at least in part on less than all of the SPS candidate resources of the plurality of SPS candidate resources having RSSI values within the threshold deviation.

48. The apparatus of claim 36, wherein the instructions are further executable by the processor to cause the apparatus to:
  determine a geographical or temporal context associated with the UE; and
  adjust a probability associated with performing the SPS resource reselection process based at least in part on the geographical or temporal context.

49. The apparatus of claim 36, wherein the instructions are further executable by the processor to cause the apparatus to:
  perform the SPS resource reselection process, wherein a subframe selection probability for each candidate subframe is biased based on an average number of times that a subchannel of the each candidate subframe is included in a candidate block.

50. The apparatus of claim 36, wherein the shared channel is within a vehicle-to-everything (V2X) network.

51. An apparatus for wireless communication at a user equipment (UE), comprising:
  means for identifying that the UE is configured to transmit via a plurality of periodic semi-persistently scheduled (SPS) resources on a shared channel accessed in a half-duplex manner;
  means for muting transmission of a scheduled message during at least one of the SPS resources in order to monitor for transmissions from another device during the at least one SPS resource based at least in part on a probability parameter whose value is based on occurrence of a triggering event, wherein the muting comprises skipping transmission of the scheduled message during the at least one SPS resource;
  means for detecting a transmission from the other device on the shared channel during the at least one SPS resource; and
  means for adjusting, based at least in part on detection of the transmission from the other device during the at least one SPS resource, transmission of the scheduled message to a different resource in order to avoid overlapping transmissions from the other device.

52. An apparatus for wireless communication at a user equipment (UE), the method comprising, comprising:
  means for identifying that the UE is configured for semi-persistently scheduled (SPS) transmissions via a configuration of periodic SPS resources on a shared channel accessed in a half-duplex manner;
  means for detecting a collision, an energy level above a first threshold, a total received power above a second threshold, or any combination thereof on an SPS resource of the periodic SPS resources;
  means for adjusting a probability associated with refraining from performing an SPS resource reselection process based at least in part on whether a level of congestion of all subchannels and subframes of a total quantity of periodic SPS resources satisfies a third threshold;
  means for triggering, based at least in part on the detecting and the probability, the UE to participate in the SPS resource reselection process to update the configuration of periodic SPS resources; means for measuring signals indicative of potential interference during one or more subframes that include the periodic SPS resources;
  means for identifying, based at least in part on the measuring, potential interference on a portion of frequency resources in a subframe of the one or more subframes; and
  means for excluding an entirety of the subframe from the SPS resource reselection process based at least in part on the potential interference being identified on the portion of frequency resources in the subframe.

53. A non-transitory computer-readable medium storing code for wireless communication at a user equipment (UE), the code comprising instructions executable by a processor to:
  identify that the UE is configured to transmit via a plurality of periodic semi-persistently scheduled (SPS) resources on a shared channel accessed in a half-duplex manner;
  mute transmission of a scheduled message during at least one of the SPS resources in order to monitor for transmissions from another device during the at least one SPS resource based at least in part on a probability parameter whose value is based on occurrence of a triggering event, wherein the muting comprises skipping transmission of the scheduled message during the at least one SPS resource;

detect a transmission from the other device on the shared channel during the at least one SPS resource; and adjust, based at least in part on detection of the transmission from the other device during the at least one SPS resource, the transmission of the scheduled message to a different resource in order to avoid overlapping transmissions from the other device.

54. A non-transitory computer-readable medium storing code wireless communication at a user equipment (UE), the code comprising instructions executable by a processor to:

identify that the UE is configured for semi-persistently scheduled (SPS) transmissions via a configuration of periodic SPS resources on a shared channel accessed in a half-duplex manner;

detect a collision, an energy level above a first threshold, a total received power above a second threshold, or any combination thereof on an SPS resource of the periodic SPS resources;

adjusting a probability associated with refraining from performing an SPS resource reselection process based at least in part on whether a level of congestion of all subchannels and subframes of a total quantity of periodic SPS resources satisfies a third threshold;

trigger, based at least in part on the detecting and the probability, the UE to participate in the SPS resource reselection process to update the configuration of periodic SPS resources;

measure signals indicative of potential interference during one or more subframes that include the periodic SPS resources;

identify, based at least in part on the measuring, potential interference on a portion of frequency resources in a subframe of the one or more subframes; and exclude an entirety of the subframe from the SPS resource reselection process based at least in part on the potential interference being identified on the portion of frequency resources in the subframe.

\* \* \* \* \*